United States Patent
Jung et al.

(10) Patent No.: US 11,075,536 B2
(45) Date of Patent: Jul. 27, 2021

(54) POWER PROVIDING DEVICE, ELECTRONIC DEVICE FOR RECEIVING POWER, AND METHOD FOR CONTROLLING THE SAME

(71) Applicant: SAMSUNG ELECTRONICS CO., LTD., Suwon-si (KR)

(72) Inventors: Ji-Hoon Jung, Seoul (KR); Bong-Chul Kim, Seoul (KR); Ki-Young Kim, Yongin-si (KR); Dae-Hyun Kim, Incheon (KR); Sang-Wook Kwon, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/671,757

(22) Filed: Aug. 8, 2017

(65) Prior Publication Data
US 2018/0062409 A1 Mar. 1, 2018

Related U.S. Application Data

(60) Provisional application No. 62/378,315, filed on Aug. 23, 2016.

(30) Foreign Application Priority Data

Oct. 18, 2016 (KR) .......................... 10-2016-0135110

(51) Int. Cl.
*H02J 7/00* (2006.01)
*H02J 7/34* (2006.01)

(52) U.S. Cl.
CPC ............ *H02J 7/0072* (2013.01); *H02J 7/342* (2020.01); *H02J 7/00* (2013.01); *H02J 7/00034* (2020.01)

(58) Field of Classification Search
CPC .. H02J 7/0072; H02J 2007/0096; H02J 7/342; H02J 7/00034; H02J 7/00
(Continued)

(56) References Cited

U.S. PATENT DOCUMENTS

| 5,287,286 A * | 2/1994 | Ninomiya .......... G01R 31/3648 702/63 |
| 5,633,576 A * | 5/1997 | Rose ................. H02J 7/007184 320/160 |

(Continued)

FOREIGN PATENT DOCUMENTS

| CN | 104967201 | 10/2015 | |
| EP | 2546094 A1 * | 1/2013 | .............. B60L 53/14 |

(Continued)

OTHER PUBLICATIONS

International Search Report dated Nov. 15, 2017 in counterpart International Patent Application No. PCT/KR2017/008525.

(Continued)

*Primary Examiner* — M Baye Diao
(74) *Attorney, Agent, or Firm* — Nixon & Vanderhye P.C.

(57) ABSTRACT

A power providing device according to an embodiment of the present disclosure comprises a charger configured to adjust at least one of a voltage and a current of power provided from a power supplying source and to provide the adjusted power to an electronic device and a processor configured to receive, from the electronic device, at least one of identification information of the electronic device and information related to a battery of the electronic device, and to control the charger to adjust at least one of the voltage and the current of the power using at least one of the identification information about the electronic device and the information related to the battery of the electronic device.

11 Claims, 18 Drawing Sheets

(58) Field of Classification Search
USPC .................................................. 320/106, 128
See application file for complete search history.

(56) References Cited

U.S. PATENT DOCUMENTS

| | | | | |
|---|---|---|---|---|
| 6,005,367 | A | 12/1999 | Rohde | |
| 6,157,169 | A * | 12/2000 | Lee .................. | G01R 19/16542 320/132 |
| 6,759,832 | B2 * | 7/2004 | Minamiura ............. | B60L 58/10 320/150 |
| 6,882,130 | B2 * | 4/2005 | Handa .................. | H02M 3/155 320/135 |
| 8,305,737 | B2 * | 11/2012 | Ewing ...................... | G05F 3/00 361/622 |
| 8,803,366 | B2 * | 8/2014 | Proud ...................... | G06F 8/65 307/104 |
| 9,513,945 | B2 * | 12/2016 | Shimogawa ........ | G06F 9/45558 |
| 9,577,456 | B2 * | 2/2017 | Takemura ............. | B60R 16/033 |
| 9,608,456 | B2 * | 3/2017 | Martin ...................... | H02J 7/00 |
| 9,851,728 | B2 * | 12/2017 | Matsuoka ................ | F24F 11/30 |
| 10,037,743 | B2 * | 7/2018 | Zeine .................... | G06F 1/1698 |
| 10,079,620 | B2 * | 9/2018 | Tanabe ................ | H04B 5/0031 |
| 10,116,157 | B2 * | 10/2018 | Lei .......................... | H02J 7/007 |
| 10,135,263 | B2 * | 11/2018 | Jung ..................... | H02J 7/0055 |
| 10,408,886 | B2 * | 9/2019 | Joe ....................... | G01R 31/382 |
| 2006/0012339 | A1 * | 1/2006 | Lee ....................... | H02J 7/0071 320/125 |
| 2008/0007212 | A1 * | 1/2008 | Theytaz ................ | H02J 7/0013 320/107 |
| 2010/0148731 | A1 | 6/2010 | Notten et al. | |
| 2011/0018679 | A1 | 1/2011 | Davis et al. | |
| 2012/0158330 | A1 * | 6/2012 | Araki .................... | G01R 31/392 702/63 |
| 2015/0100260 | A1 * | 4/2015 | Joe ........................ | H01M 10/48 702/63 |
| 2015/0123595 | A1 | 5/2015 | Hussain et al. | |
| 2015/0123597 | A1 * | 5/2015 | Son ........................ | H02J 7/0068 320/107 |
| 2015/0340898 | A1 | 11/2015 | Schwartz et al. | |
| 2016/0020620 | A1 | 1/2016 | Lee et al. | |
| 2016/0028254 | A1 * | 1/2016 | Honoki .................. | H02J 7/007 320/162 |
| 2016/0126755 | A1 * | 5/2016 | Kechmire ........... | H02J 7/00047 320/106 |
| 2017/0040805 | A1 | 2/2017 | Huang et al. | |
| 2017/0373522 | A1 * | 12/2017 | Pelosi ................... | H02J 7/0027 |
| 2018/0262061 | A1 * | 9/2018 | Tanabe .................... | H02J 50/80 |
| 2018/0366085 | A1 * | 12/2018 | Zeine ..................... | G06F 1/266 |
| 2019/0229547 | A1 * | 7/2019 | Lim .................... | H01M 10/425 |

FOREIGN PATENT DOCUMENTS

| | | | |
|---|---|---|---|
| EP | 2 887 492 A2 | 6/2015 | |
| EP | 2908402 A1 * | 8/2015 | .......... H02J 7/00036 |
| KR | 20-0326739 | 6/2003 | |
| KR | 10-0854416 | 8/2008 | |
| KR | 10-2012-0052347 | 7/2013 | |
| KR | 10-2013-0134686 | 12/2013 | |
| KR | 10-1347211 | 1/2014 | |
| KR | 10-2016-0009321 | 1/2016 | |
| KR | 10-2016-0078496 | 7/2016 | |
| WO | 2011/161510 | 12/2011 | |

OTHER PUBLICATIONS

European Search Report for EP Application No. 17843843.8 dated Apr. 29, 2019.

India Office Action dated Dec. 11, 2020 for IN Application No. 201917010406.

* cited by examiner

POWER PROVIDING DEVICE, ELECTRONIC DEVICE FOR RECEIVING POWER, AND METHOD FOR CONTROLLING THE SAME

CROSS-REFERENCE TO RELATED APPLICATIONS

This application is based on and claims priority under 35 U.S.C. § 119 to a U.S. provisional patent application filed in the United States Patent and Trademark Office on Aug. 23, 2016 and assigned Ser. No. 62/378,315, and a Korean patent application filed in the Korean Intellectual Property Office on Oct. 18, 2016 and assigned Serial No. 10-2016-0135110, the disclosures of which are incorporated by reference herein in their entireties.

TECHNICAL FIELD

The present disclosure relates generally to power providing devices, electronic devices for receiving power, and methods for controlling the same.

DISCUSSION OF RELATED ART

Compact, portable electronic devices are recently spreading widely. Electronic devices, in spite of their reduced size, use high-performance hardware units to perform various operations. Smartphones, tablet PCs, cordless vacuum cleaners, wireless earphones, or other various types of electronic devices are also commonplace and may operate with power from their embedded battery without the need for a wired connection. Conventional portable electronic devices receive power via their dedicated adapters. Such electronic devices are charged via their dedicated adapters because their embedded batteries have different rated voltages, rated currents, or rated power levels.

Conventional adapters or other power providing devices are fitted only for charging a particular type of electronic device, and they may thus supply power available only to the battery or charger of the particular electronic device. This leads to the issue that multiple types of electronic devices cannot be charged by a single adapter. Moreover, adapters are set to supply power corresponding to only particular devices. There is no technology known to supply power considering the battery life or safety of the electronic device that receives the power.

The above information is presented as background information only to assist with an understanding of the present disclosure.

SUMMARY

According to various example embodiments of the present disclosure, power providing devices capable of determining the magnitude of power that is supplied to an electronic device using at least one of identification information about the electronic device and information related to the battery of the electronic device and methods for controlling the power providing device are provided.

According to example embodiments of the present disclosure, electronic devices that receive power from such power providing device and methods for controlling the electronic devices may also be provided.

According to an example embodiment of the present disclosure, a power providing device comprises a charger configured to adjust at least one of a voltage and a current of power provided from a power supplying source and to provide the adjusted power to an electronic device; and a processor configured at least to receive, from the electronic device, at least one of identification information about the electronic device and information related to a battery of the electronic device, and to control the charger to adjust at least one of the voltage and the current of the power using at least one of the identification information about the electronic device and the information related to the battery of the electronic device.

According to an example embodiment of the present disclosure, an electronic device receiving power from a power providing device comprises a battery; and a processor configured to at least send at least one of identification information about the electronic device and information related to the battery to the power providing device, wherein the electronic device is configured to at least receive power having a magnitude adjusted based on at least one of the identification information about the electronic device and the information related to the battery and to charge the battery.

According to an example embodiment of the present disclosure, a method for controlling an electronic device that receives power from a power providing device may comprise sending at least one of identification information about the electronic device and information related to a battery of the electronic device to the power providing device; and receiving power having a magnitude adjusted based on at least one of the identification information about the electronic device and the information related to the battery; and charging the battery.

According to an example embodiment of the present disclosure, a method for controlling a power providing device that provides power to an electronic device may comprise receiving, from the electronic device, at least one of identification information about the electronic device and information related to a battery of the electronic device; determining at least one of a voltage and a current of the power using at least one of the identification information about the electronic device and the information related to the battery of the electronic device; and providing power with at least one of the determined voltage and the determined current to the electronic device.

According to an example embodiment of the present disclosure, a method for controlling a server that manages a plurality of electronic devices may comprise sending a first charging profile; receiving information related to a battery of a first electronic device that performs charging based on the first charging profile; varying a charging profile of the first electronic device from the first charging profile to a second charging profile based on the information related to the battery of the first electronic device; and sending the second charging profile.

According to an example embodiment of the present disclosure, a server managing a plurality of electronic devices may comprise a communication circuit; and at least one processor configured to at least control to send, through the communication circuit, a first charging profile, control to receive, through the communication circuit, information related to a battery of a first electronic device that performs charging based on the first charging profile, control to vary a charging profile of the first electronic device from the first charging profile to a second charging profile based on the information related to the battery of the first electronic device, and control to send, through the communication circuit, the second charging profile.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1A:
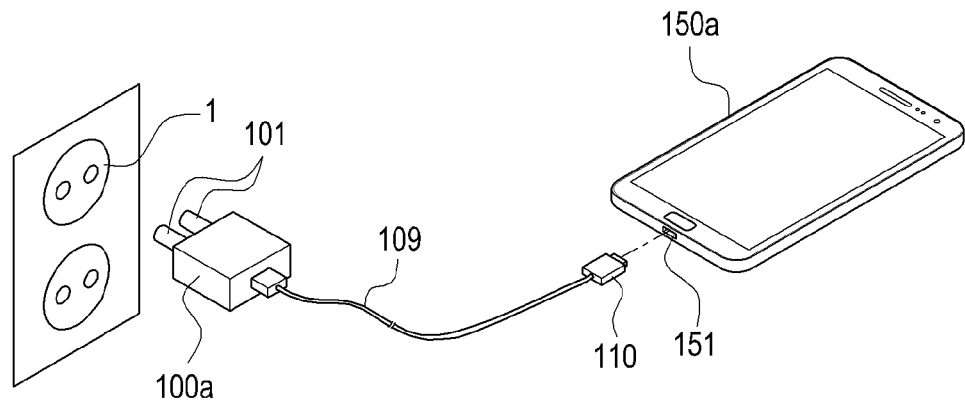
FIG. 1A is drawing illustrating an example of an adapter and an electronic device according to an example embodiment of the present disclosure.

Hereinafter, various example embodiments of the present disclosure are described with reference to the accompanying drawings. However, it will be appreciated that the present disclosure is not limited to the example embodiments and the terminology used herein, and all changes and/or equivalents or replacements thereto also belong to the scope of the present disclosure. The same or similar reference numerals may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be used interchangeably with other terms, such as "suitable for," "capable of," "modified to," "made to," "adapted to," "able to," or "designed to" in hardware or software in the context. Rather, the term "configured to" may refer to a situation in which a device can perform an operation together with another device or parts. For example, the term "processor configured (or set) to perform A, B, and C" may refer, for example, to a generic-purpose processor (e.g., a CPU or application processor) that may perform the operations by executing one or more software programs stored in a memory device or a dedicated processor (e.g., an embedded processor) for performing the operations.

For example, examples of the electronic device according to example embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame, or the like, but is not limited thereto. According to an example embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler), or the like, but is not limited thereto. According to various example embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves), or the like, but is not limited thereto. According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

FIG. 1A is a diagram illustrating an example adapter and an electronic device according to an example embodiment of the present disclosure. In the example embodiment of FIG. 1A, the power providing device may be an adapter 100a, and an electronic device receiving power may be an electronic device 150a, such as, for example, and without limitation, a smartphone. Referring to FIG. 1A, the adapter 100a may include a plug 101 capable of connection to a wall socket 1. The plug 101 may be implemented in a shape corresponding to the wall socket 1 and may receive power from an external power source, e.g., a power supply source, via the wall socket 1. The adapter 100a may down-convert the power received via the plug 101 and deliver the down-converted power to the electronic device 150a. The adapter 100a may lower the received power to a preset level and may also rectify the power. For example, where the power received from the wall socket 1 is alternating current (AC) power of 220V, the adapter 100a may output direct current (DC) power of 5V. The adapter 100a may include a connector 110 for connection with the electronic device 150a. According to an example embodiment of the present disclosure, the connector 110 may include a connection terminal as defined in the universal serial bus (USB) standards. The electronic device 150a may also include a port 151 capable of connection with the connector 110. According to an example embodiment of the present disclosure, the adapter 100a may adjust at least one of the voltage and the current of power output using identification information about the electronic device 150a. For example, a first type of electronic device may previously be set to receive a first voltage and a first current, and a second type of electronic device may previously be set to receive a second voltage and a second current. When the electronic device 150a is determined to be of the first type, the adapter 100a may output first power having the first voltage and the first current. When the electronic device 150a is determined to be of the second type, the adapter 100a may output second power having the second voltage and the second current. In other words, according to an example embodiment of the present disclosure, the adapter 100a may determine at least one of the voltage and the current of power corresponding to the type of the electronic device 150a. Further, the adapter 100a may vary at least one of the voltage and the current of power supplied, rather than providing a fixed voltage and current. Accordingly, the adapter 100a may include a charger capable of adjusting at least one of the voltage and the current of power output, which is described below in greater detail.

A cable 109 may include a path for power transmission and a path for data transmission. For example, where the adapter 100a includes the connector 110 and the cable 109 as defined in the USB standards, the adapter 100a may supply power to the electronic device 150a through a lane for power transmission as defined in the USB standards. Meanwhile, the adapter 100a may receive the identification information about the electronic device 150a through a data lane and determine at least one of the voltage and the current of the power supplied to the electronic device 150a using the received identification information. Here, the lane may also be referred to, for example, as a line.

According to an example embodiment of the present disclosure, the electronic device 150a itself may determine at least one of the voltage and the current of power to be supplied. In this case, the electronic device 150a may send information about the determined, at least one, of the current and voltage to the adapter 100a through the data lane of the cable 109. The adapter 100a may also determine at least one of the voltage and the current of power to be supplied through a power lane of the cable 109 based on the received information about the at least one of the voltage and the current.

According to an example embodiment of the present disclosure, the adapter 100a may determine at least one of the voltage and the current of power supplied using information related to the battery of the electronic device 150a. The adapter 100a may obtain information related to the degree of aging of the battery of the electronic device 150a. For example, the electronic device 150a may provide the degree of variation in battery voltage per unit time or the degree of variation in battery capacity per unit time to the adapter 100a. The degree of variation in battery voltage per unit time or the degree of variation in battery capacity per unit time, e.g., the degree of variation in remaining battery, may vary depending on the degree of aging of the battery. Accordingly, the electronic device 150a or adapter 100a may determine the degree of aging of the battery depending on the degree of variation in battery voltage per unit time or degree of variation in battery capacity per unit time. It may readily be appreciated by one of ordinary skill in the art that there is no limitation to the information related to the degree of aging as long as the degree of aging of the battery may be determined by the information.

The adapter 100a may determine at least one of the current and voltage of power to be supplied based on the received information related to the battery. For example, upon determining that the battery has been aged relatively more, the adapter 100a may provide a relatively smaller magnitude of power. Or, upon determining that the battery has been aged relatively less, the adapter 100a may provide a relatively larger magnitude of power. In cases where the battery is aged relatively more, and a relatively larger magnitude of power is provided to the battery, the aging of the battery may be accelerated. Thus, the adapter 100a may determine at least one of the voltage and the current of power provided depending on the degree of aging. Or, the electronic device 150a itself may determine the magnitude of power corresponding to the degree of aging of the battery and deliver information about the determined magnitude of power to the adapter 100a. In this case, the adapter 100a may determine at least one of the voltage and the current of power based on the received information and provide power with the determined voltage or current to the electronic device 150a.

As set forth above, the adapter 100a may identify the identification information about the electronic device 150a and determine at least one of the voltage and the current of power to be supplied based on the result of identification. The adapter 100a may determine at least one of the voltage and the current of power to be provided based on the information related to the battery of the electronic device 150a. Accordingly, the adapter 100a may provide power fitted for each of various types of electronic devices and provide power considering the degree of aging of the battery in the electronic device to prolong the battery life of the electronic device. The power receiving electronic device 150a itself may determine the magnitude of the power that it is to receive based on at least one of the identification information and battery-related information and send a request to the adapter 100a.

According to an example embodiment of the present disclosure, the adapter 100a may determine a charging profile for the electronic device 150a. For example, the charging profile may refer, for example, to the magnitude of power charged over time. For example, the adapter 100a may vary the magnitude of power provided over time. The information about the magnitude of power over may be named the charging profile. The adapter 100a may also determine the charging profile based on at least one of the identification information about the electronic device 150a and the information related to the battery of the electronic device 150a.

Figure 1B:
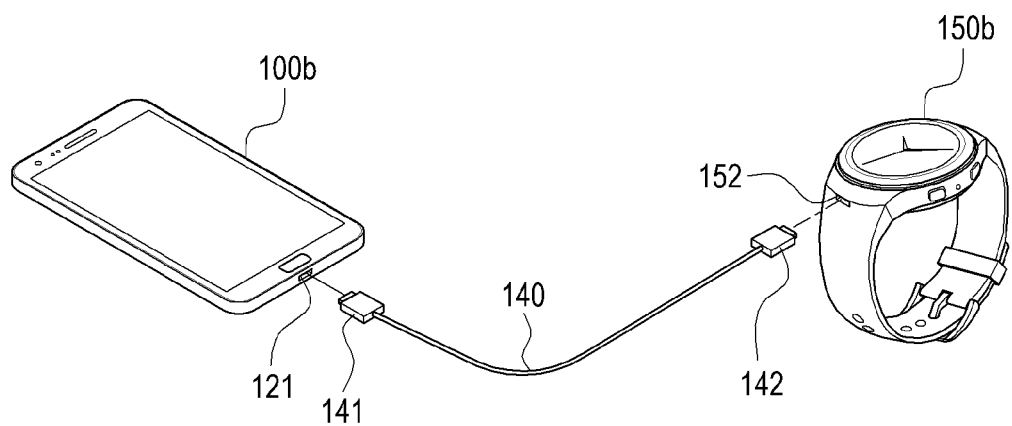
FIG. 1B is a diagram illustrating an example power providing device and an electronic device receiving power according to an example embodiment of the present disclosure.

FIG. 1B is a diagram illustrating an example power providing device and an electronic device receiving power according to an example embodiment of the present disclosure. In the example embodiment of FIG. 1B, the power providing device 100b may be an electronic device, e.g., without limitation, a smartphone, and an electronic device receiving power may be an electronic device 150b including for example, and without limitation, a wearable device, e.g., a smart watch. Here, a power supplying source may be a battery included in the power providing device 100b. As described below in greater detail, the power providing device 100b, e.g., a smartphone, may include a power management integrated chip (PMIC) capable of adjusting at least one of the voltage and the current of power and may thus output various magnitudes of power. The power providing device 100b may connect with the electronic device 150b via a cable 140. A first connector 141 of the cable 140 may be connected to a port 121 of the power providing device 100b, and a second connector 142 of the cable 140 may be connected to a port 152 of the electronic device 150b. Where the cable 140 may, for example, be one defined in the USB standards, the power providing device 100b may receive identification information about the electronic device 150b and information related to the battery of the electronic device 150b through a data lane as defined in the USB standards. As described above, the power providing device 100b may determine the magnitude of power provided based on at least one of the identification information about the electronic device 150b connected and the battery-related information. Meanwhile, according to an example embodiment of the present disclosure, the electronic device 150b may send at least one of the identification information and battery-related information to the power providing device 100b not through wired communication but through wireless communication.

Meanwhile, according to an example embodiment of the present disclosure, the electronic device may wirelessly receive power from the power providing device. For example, the electronic device may wirelessly receive power form the power providing device based on various wireless charging schemes, e.g., magnetic induction, resonance, or radio frequency (RF) scheme. In this case, the electronic device may wirelessly communicate with the power providing device. The electronic device may send information related to, e.g., the degree of aging of the battery to the power providing device. The power providing device may determine at least one of the voltage and the current of power to be provided to the electronic device based on the degree of aging of the battery. The electronic device itself may determine at least one of the voltage and the current of power to be received, corresponding to the degree of aging of the battery. The electronic device may send the determined information, e.g., a charging profile, to the power providing device through wireless communication. The charging profile is described below in greater detail. The power providing device may wirelessly provide power to the electronic device according to the received charging profile.

Figure 2:
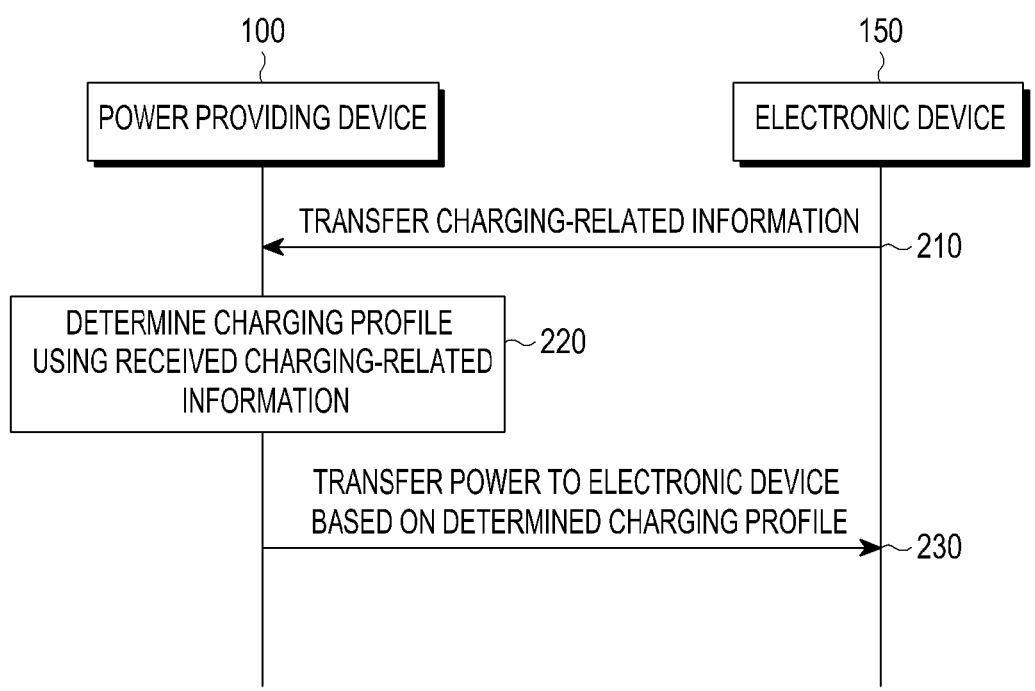
FIG. 2 is a flowchart illustrating an example method for controlling a power providing device and electronic device according to an example embodiment of the present disclosure.

FIG. 2 is a flowchart illustrating an example method for controlling a power providing device and electronic device according to an example embodiment of the present disclosure. Hereinafter, at least one of the power providing device and electronic device that performs a particular operation may refer, for example to a processing or controller circuit, e.g., a processor or micro controlling unit (MCU), in at least one of the power providing device and electronic device that performs a particular operation or enables another hardware unit to perform a particular operation.

In operation 210, the electronic device 150 for receiving power may provide charging-related information to the power providing device 100. For example, the electronic device 150 may connect in a wired manner with the power providing device 100 via a USB cable and provide the charging-related information to the power providing device 100 via a data lane. The electronic device 150 may send the charging-related information to the power providing device 100 through wireless communication. For example, the electronic device 150 and the power providing device 100 may include a communication circuit capable of wireless communication and may transmit or receive data by performing wireless communication based on various communication schemes. The electronic device 150 may transmit a communication signal containing the charging-related information to the power providing device 100 through the communication circuit. The charging-related information may be information for adjusting the magnitude of power that the power providing device 100 provides and may include at least one of, e.g., identification information about the electronic device 150 and information related to the battery of the electronic device 150.

In operation 220, the power providing device 100 may determine the charging profile using the received charging-related information. In operation 230, the power providing device 100 may transfer power to the electronic device 150 based on the determined charging profile. Therefore, the power providing device 100 may determine the charging profile based on at least one of, e.g., the identification information and the information related to the battery of the electronic device 150.

Figure 3:
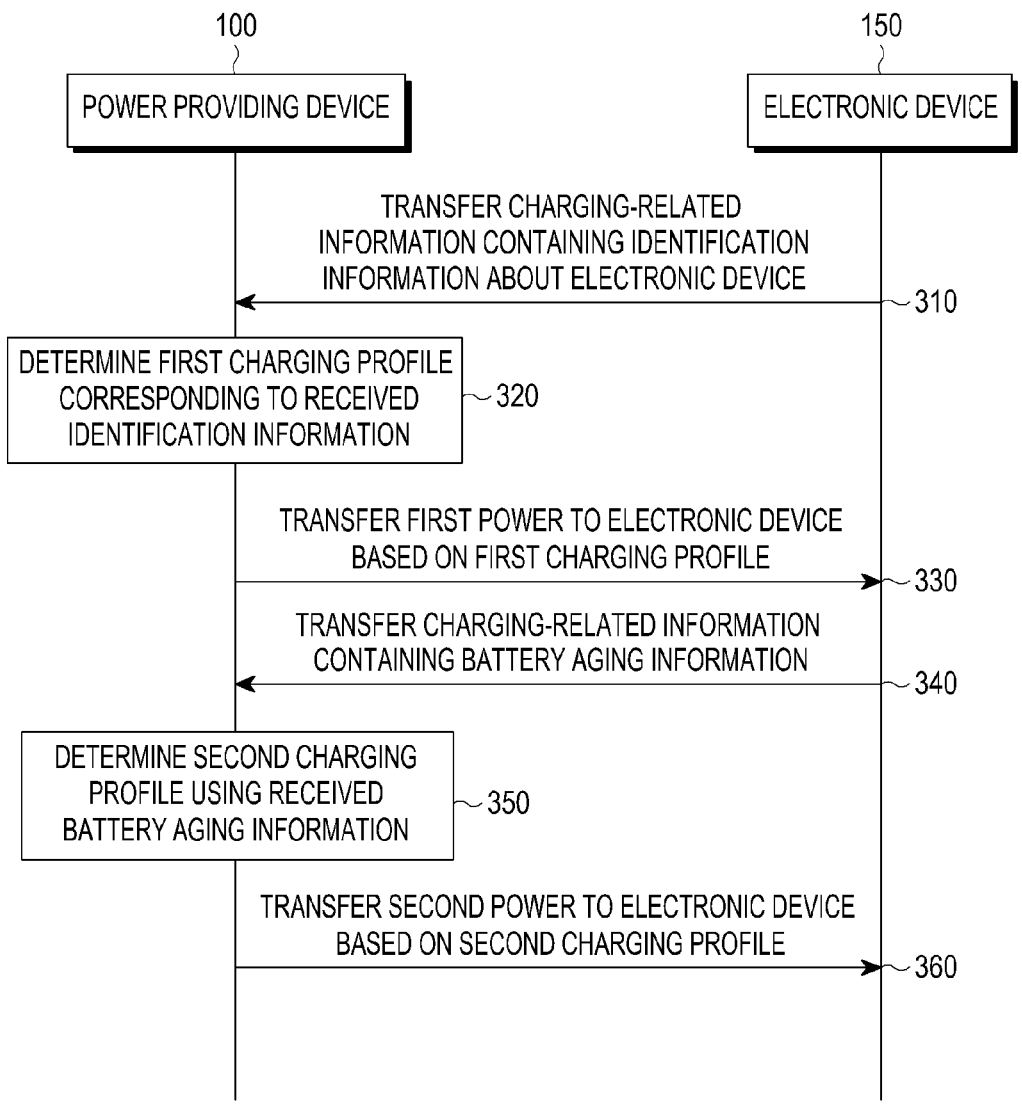
FIG. 3 is a flowchart illustrating an example method for controlling a power providing device and electronic device according to an example embodiment of the present disclosure.

FIG. 3 is a flowchart illustrating an example method for controlling a power providing device and electronic device according to an example embodiment of the present disclosure.

In operation 310, the electronic device 150 for receiving power may deliver charging-related information containing identification information about the electronic device 150 to the power providing device 100. The electronic device 150 may send the identification information to the power providing device 100 via, e.g., a USB cable. In operation 320, the power providing device 100 may determine a first charging profile corresponding to the received identification information.

The identification information may, for example, be set to be the manufacturer or model number of the electronic device 150. In this case, the power providing device 100 may previously store correlation information between at least one of a rated voltage, rated current, and rated power mapped to, e.g., the manufacturer or model number of the electronic device 150. The power providing device 100 may identify at least one of the rated voltage, rated current, and rated power mapped to the identification information and thus determine the charging profile. The power providing device 100 may previously store the correlation information of the charging profile mapped to the manufacturer or model number of the electronic device 150. The power providing device 100 may also identify the charging profile mapped to the identification information.

According to an example embodiment of the present disclosure, the identification information may include information capable of identifying the magnitude of power for charging. For example, the electronic device 150 may previously store identification information for providing power for charging. The electronic device 150 may provide the power providing device 100 with identification information containing at least one of the rated voltage, rated current, and rated power of a charger or battery. The power providing device 100 may identify the received identification information and determine at least one of the voltage and the current of power to be provided corresponding thereto. Or, the identification information may contain identification information about the charging profile in which case the power providing device 100 may select a charging profile corresponding to the received identification information about the charging profile.

In operation 330, the power providing device 100 may transfer first power to the electronic device 150 based on a first charging profile. In operation 340, the power providing device 100 may receive charging-related information containing information related to the aging of the battery of the electronic device 150. Here, the information related to the aging of the battery may include at least one of the degree of variation in battery voltage per unit time and degree of variation in battery capacity per unit time. The information related to the aging of the battery is described below with reference to FIGS. 4A and 4B.

Figure 4A:
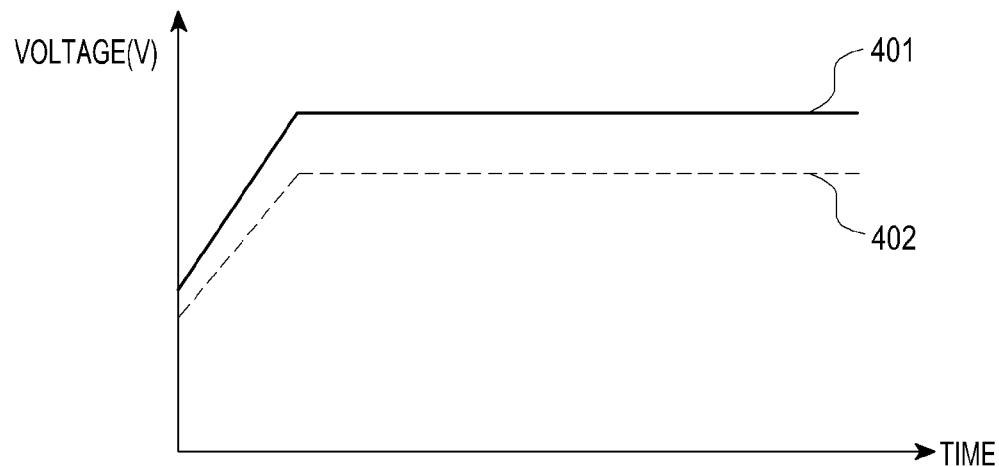
FIG. 4A is a graph illustrating an example voltage variation in the battery of an electronic device while charging is in progress according to an example embodiment of the present disclosure.

FIG. 4A is a graph illustrating example voltage variation in the battery of an electronic device while charging is in progress according to an example embodiment of the present disclosure. For a battery that has been aged relatively more, the voltage 402 may increase at a relatively small slope. Meanwhile, for a battery that has been aged relatively less, the voltage 401 may increase at a relatively large slope. As the number of times of charging increases, the rate of voltage increase may lower while charging. Accordingly, the degree of aging of the battery may be determined depending on the degree of variation in voltage per unit time, e.g., the slope. At the beginning, the electronic device 150 may perform charging based on a first charging profile associated with identification information. The electronic device 150 may continuously monitor the battery voltage as the charging is in progress and determine the degree of variation in voltage per unit time based on the voltage monitored per time. The electronic device 150 may deliver the degree of variation in voltage per unit time to the power providing device 100, and the power providing device 100 may determine the degree of aging of the battery in the electronic device 150 based on the received degree of variation in voltage per unit time. The electronic device 150 may provide the voltage monitored per time to the power providing device 100, and the power providing device 100 may compute the degree of variation in voltage per unit time and determine the degree of aging of the battery of the electronic device 150 based on a result of the computation.

Figure 4B:
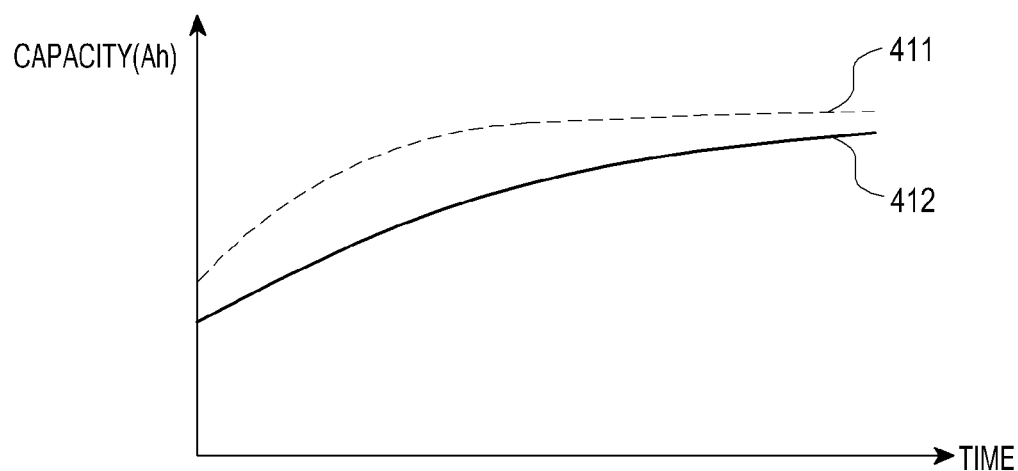
FIG. 4B is a graph illustrating an example capacity variation in the battery of an electronic device while charging is in progress according to an example embodiment of the present disclosure.

FIG. 4B is a graph illustrating example capacity variation in the battery of an electronic device while charging is in progress according to an example embodiment of the present disclosure. The capacity may indicate the amount of power charged to the battery and may be represented in unit of Ah as, e.g., the product of current and time. For a battery that has been aged relatively more, the capacity 411 may increase at a relatively large slope. Meanwhile, for a battery that has been aged relatively less, the capacity 412 may increase at a relatively small slope. Accordingly, the degree of aging of the battery may be determined depending on the degree of variation in capacity per unit time, e.g., the slope. The power providing device 100 may determine the degree of aging of the battery of the electronic device 150 based on the degree of variation in capacity per unit time.

Referring back to FIG. 3, in operation 350, the power providing device 100 may determine a second charging profile using the received information related to the aging of the battery. When a larger magnitude of power is applied to the battery that has aged relatively more, the aging of the battery may be accelerated or the battery may be deteriorated. Accordingly, the power providing device 100 may provide a relatively small magnitude of power to the battery that has aged relatively more. According to an embodiment of the present disclosure, the power providing device 100 may previously store the degree of aging of the battery and a charging profile corresponding thereto and may determine that a charging profile corresponding to the determined degree of aging is a second charging profile. In operation 360, the power providing device 100 may transfer second power to the electronic device 150 based on the second charging profile. As set forth above, the power providing device 100 may first perform charging with a charging profile corresponding to identification information about the electronic device 150 receiving power, and the power providing device 100 may vary the charging profile based on feedback information during the course of the charging and continue to charge.

Meanwhile, according to an example embodiment of the present disclosure, the electronic device 150 may previously store the degree of aging of the battery. The electronic device 150 may store the degree of aging of the battery determined as a result of performing the latest charging, and upon detecting a connection to the power providing device 100, the electronic device 150 may provide the degree of aging of the battery to the power providing device 100. In this case, the power providing device 100 may determine the charging profile based on the degree of aging of the battery and the identification information about the electronic device 150 from the time that the charging is started.

Figure 5:
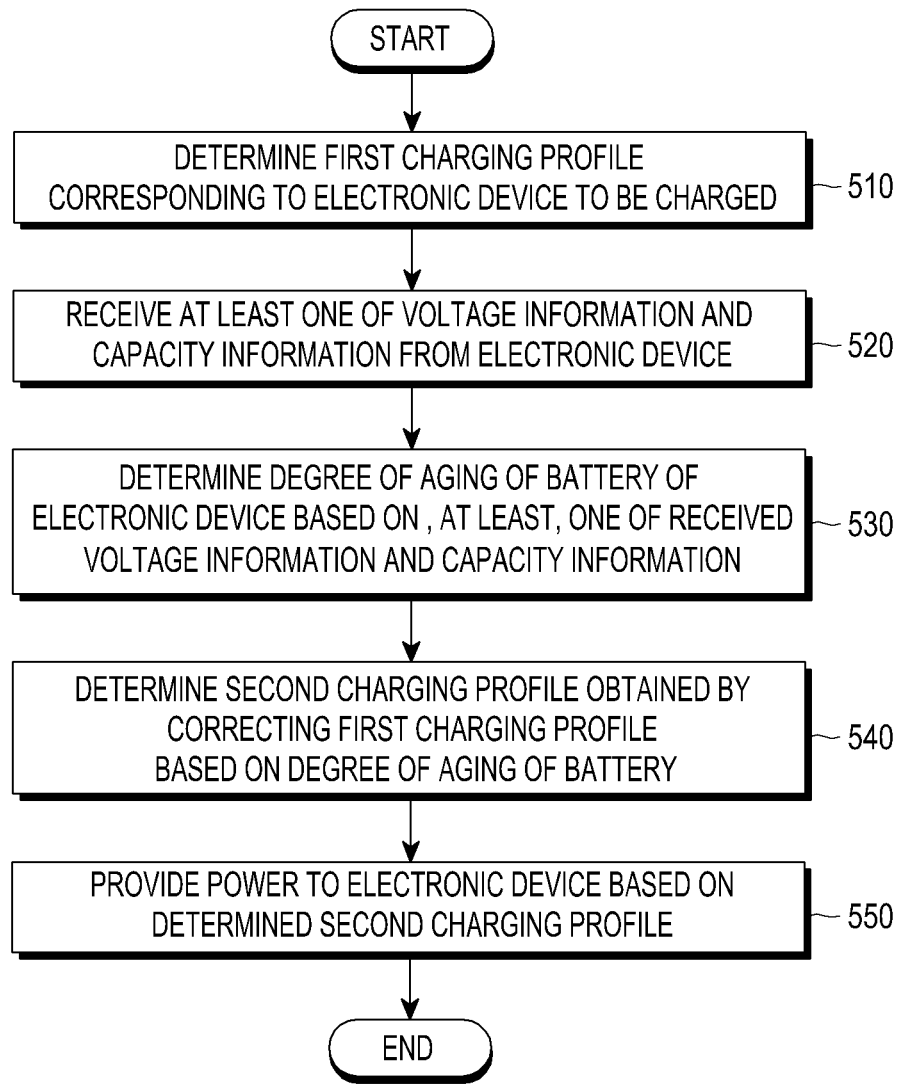
FIG. 5 is a flowchart illustrating an example method for controlling a power providing device according to an example embodiment of the present disclosure.
Figure 6:
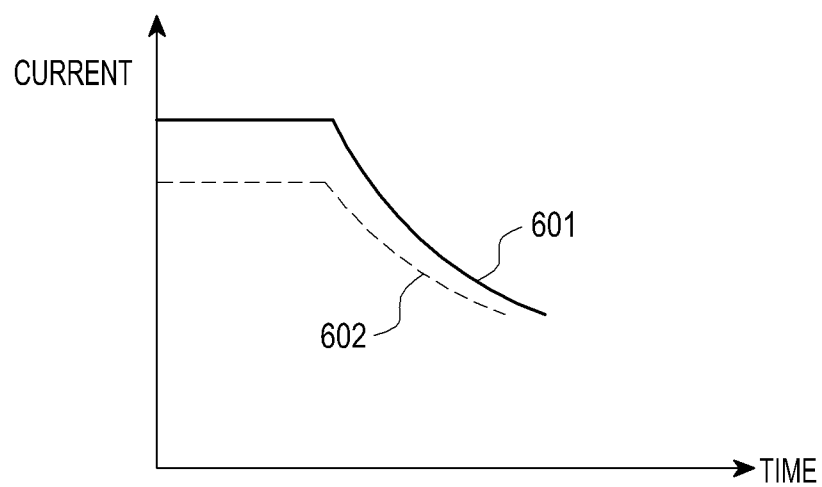
FIG. 6 is a graph illustrating an example charging profile according to an example embodiment of the present disclosure.

FIG. 5 is a flowchart illustrating an example method for controlling a power providing device according to an example embodiment of the present disclosure. The embodiment of FIG. 5 is described in further detail with reference to FIG. 6. FIG. 6 is a diagram illustrating an example charging profile according to an example embodiment of the present disclosure.

In operation 510, the power providing device 100 may determine a first charging profile corresponding to the electronic device 150 which is a target for charging. For example, the power providing device 100 may determine a first charging profile 601, as illustrated in FIG. 6, based on identification information about the electronic device 150. The first charging profile 601 may be a graph for current per time. For example, such a profile may be provided that the operation is performed in a constant current (CC) charging mode where the charging is conducted with a constant value of current at the beginning of the charging and then in a constant voltage (CV) mode where the current provided gradually decreases. Although not shown, the voltage provided while the current reduces in the first charging profile 601 may remain at a constant value. The power providing device 100 may determine the magnitude of current provided in the CC mode corresponding to an identifier of the electronic device 150. Meanwhile, the power providing device 100 may also select the first charging profile depending on whether the electronic device 150 performs quick charging or normal charging. For example, a larger magnitude of power may be provided in the quick charging than in the normal charging. A charging profile including the CC mode-CV mode may apply in the normal charging, and a charging profile consisting of a multi-step constant current (MSCC) mode or multi-step constant voltage (MSCV) mode may apply in the quick charging. As such, the waveform of the charging profile may be varied.

In operation 520, the power providing device 100 may receive at least one of voltage information and capacity information, e.g., at least one of information related to a variation in voltage over time and information related to a variation in capacity over time, from the electronic device 150. As described above, the electronic device 150 may continue to monitor the voltage applied to the battery over time and may thus provide per-time voltage information to the power providing device 100. In operation 530, the power providing device 100 may determine the degree of aging of the battery in the electronic device based on at least one of the received voltage information and capacity information. In operation 540, the power providing device 100 may determine a second charging profile that is obtained by correcting a first charging profile based on the degree of aging of the battery. The power providing device may also determine the second charging profile using at least one of the voltage information and capacity information while skipping the operation of determining the degree of aging of the battery. For example, the power providing device 100 may generate the second charging profile 602 where the magnitude of the current in the CC mode has been reduced as illustrated in FIG. 6. As set forth above, as the battery ages relatively more, a relatively smaller magnitude of power needs to be supplied to the battery. Accordingly, the power providing device 100 may determine the second charging profile 602 where the magnitude of power has been relatively reduced as compared with that in the first charging profile. The power providing device 100 may select the second charging profile 602 from a plurality of charging profiles stored or may directly generate the second charging profile 602. Meanwhile, although the second charging profile 602 is shown to be smaller in power or current than the first charging profile 601 in the embodiment of FIG. 6, this is merely an example. The second charging profile 602 may have a different waveform from that of the first charging profile 601. Alternatively, the power providing device 100 may determine the second charging profile corresponding to the degree of aging of the battery directly, but not by correcting the first charging profile.

According to an embodiment of the present disclosure, the power providing device 100 may previously store a plurality of charging profiles and select a charging profile corresponding to information about the aging of the battery or the degree of variation in battery voltage or degree of variation in battery capacity. For example, where the power providing device 100 is implemented to be an adapter, it may include a micro controlling unit (MCU) with a relatively lower computational capacity rather than a high-performance processor. In this case, the power providing device 100 may determine the second charging profile in such a manner as to refer to a lookup table. For example, the lookup table may store ranges of the degree of variation in voltage per unit time and charging profiles corresponding to each range, with the ranges mapped with the charging profiles. The power providing device 100 may compare the lookup table with the degree of variation in voltage received from the electronic device 150 and determine a charging profile corresponding to the received degree of variation in voltage, thus determining a charging profile for charging the electronic device 150.

According to an embodiment of the present disclosure, the power providing device 100 may directly generate a charging profile corresponding to the degree of aging of the battery of the electronic device 150. For example, where the power providing device 100 is implemented to be an electronic device, e.g., a smartphone, it may include a relatively high-performance processor. The processor may directly generate a charging profile using a charging profile generating program or algorithm that deals with relatively many computations. The charging profile generating program may be a program that computes the magnitude of power allowing the battery a relatively longer battery lifetime or to operate more stably at the current degree of aging of the battery. The charging profile generating program may be generated by modeling using, e.g., a test result. In order to generate a more accurate program, a number of pieces of test data are required in which case a plenty of test data, e.g., big data, may be obtained, which is described below in greater detail. According to an embodiment of the present disclosure, the power providing device 100 may generate a charging profile using various models, such as a physical variable model or equivalent circuit model. The physical value model may be one obtained by modeling the correlation between the magnitude of input power and the lifespan or stability of the battery using variables indicating a physical and chemical phenomenon arising in the battery. The equivalent circuit model may be one that represents the electrical characteristics of the inside of the battery and may be obtained by modeling the correlation between the magnitude of input power and the lifespan or stability of the battery. The power providing device 100 may generate a charging profile by determining the input power that allows the battery the optimized lifespan or stability using at least one of the physical variable model and equivalent circuit model. For example, the power providing device 100 may generate a charging profile by applying the degree of variation in battery voltage per unit time or degree of variation in battery capacity per unit time in the electronic device 150 to the variables included in each model and determining the magnitude of input power that optimizes the lifespan or stability of the battery. Meanwhile, according to an embodiment of the present disclosure, a charging profile may also be generated by an external electronic device, such as the electronic device 150 or a server. In other words, the power providing device 100 or the electronic device 150 may select at least one of the voltage and the current of power for charging from among a plurality of preset values or may directly compute the same.

In operation 550, the power providing device 100 may provide power to the electronic device based on the determined second charging profile. As described above, the power providing device 100 may determine a charging profile appropriate for the degree of aging of the battery of the electronic device 150 and perform charging, extending the lifespan of the battery in the electronic device 150 or allowing the battery being aged to be charged with more safety.

Figure 7:
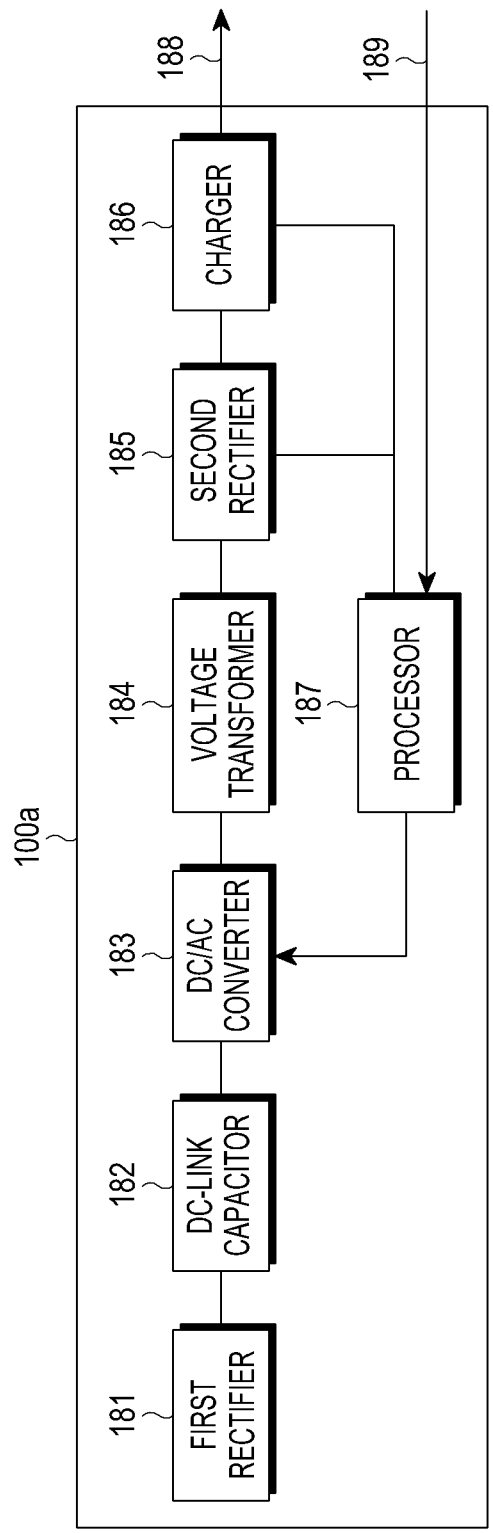
FIG. 7 is a block diagram illustrating an example adapter according to an example embodiment of the present disclosure.

FIG. 7 is a block diagram illustrating an example adapter according to an example embodiment of the present disclosure.

Referring to FIG. 7, the adapter 100a may include a first rectifier 181, a DC-link capacitor 182, a DC/AC converter 183, a voltage transformer 184, a second rectifier 185, a charger 186, and a processor (e.g., including processing circuitry) 187.

The first rectifier 181 may include circuitry to rectify an AC waveform of power received from an external power source into a DC waveform. The DC-link capacitor 182 may temporarily store the rectified power and output the temporarily stored rectified power to the DC/AC converter 183. The DC/AC converter 183 may include circuitry to convert the DC waveform of power into an AC waveform and apply the AC waveform to the primary coil of the voltage transformer 184. The secondary coil of the voltage transformer 184 may induce an AC waveform of power whose voltage has been transformed according to the turn ratio with respect to the primary coil. The second rectifier 185 may include circuitry to rectify an AC waveform of power output from the voltage transformer 184. The second rectifier 185 may output the rectified power to the charger 186. The charger 186 may include circuitry to adjust at least one of the voltage and the current of the input power and directly provide the same to the battery of the electronic device 150. The processor 187 may include various processing circuitry to control the charger 186 to control at least one of the voltage and the current of the output power 188 according to the determined charging profile. The processor 187 may determine at least of the voltage and the current of the charging power 188 based on the charging-related information 189 received from the electronic device 150 as described above. For example, the processor 187 may control the charger 186 based on the identification information about the electronic device 150, controlling at least one of the voltage and the current of the output power 188. The processor 187 may control the charger 186 based on the charging mode (e.g., a quick charging mode or normal charging mode) of the electronic device 150, controlling at least one of the voltage and the current of the output power 188. The processor 187 may control the charger 186 based on the information related to the battery of the electronic device 150, controlling at least one of the voltage and the current of the output power 188.

The processor 187 may control at least one of the DC/AC converter 183, the second rectifier 185, and the charger 186, thereby controlling at least one of the voltage and the current of the power 188 output from the charger 186, the level of power output from the second rectifier 185, and the converting gain. For example, the processor 187 may determine the information indicating that the output voltage as per the charging profile of the electronic device 150 is 4V and may thus adjust the voltage level of the power 188 output from the charger 186 to 4V. Meanwhile, when the charging profile is varied, the processor 187 may grasp the information indicating that the output voltage as per the varied charging profile is 5V and may change the voltage level of the power 188 output from the charger 186 to 5V.

The processor 187 may obtain identification information through USB communication with the electronic device 150. The processor 187 may also adjust at least one of the voltage and the current of the output power 188 based on the degree of aging of the battery in the electronic device 150. The processor 187 or a processor (not shown) included in the electronic device receiving power may include various processing circuitry, such as, for example, and without limitation, one or more of a dedicated processor, a central processing unit (CPU), an application processor (AP), or a communication processor (CP). The processor 187 may perform control on at least one of the other components of the adapter 100a, and/or perform an operation or data processing relating to communication. The processor 187 may be implemented as a MCU or mini-computer. As described above, the adapter 100a may provide the output power 188 as per various charging profiles based on the charging-related information 189.

Figure 8A:
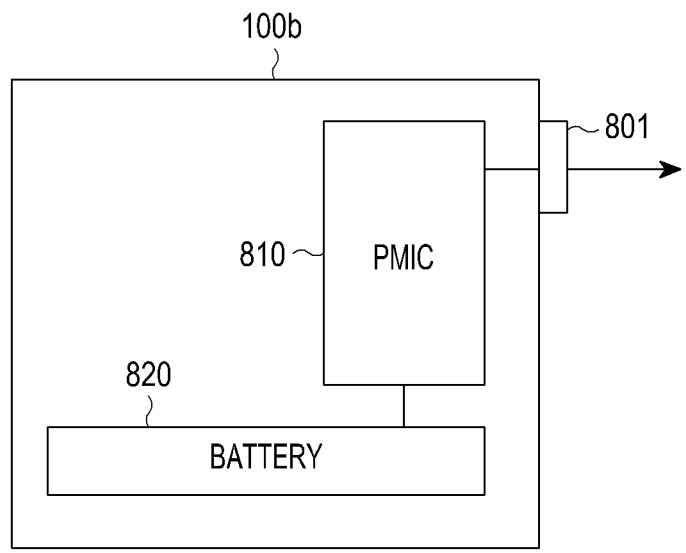
FIGS. 8A and 8B are block diagrams illustrating example electronic devices according to example embodiments of the present disclosure.
Figure 8B:
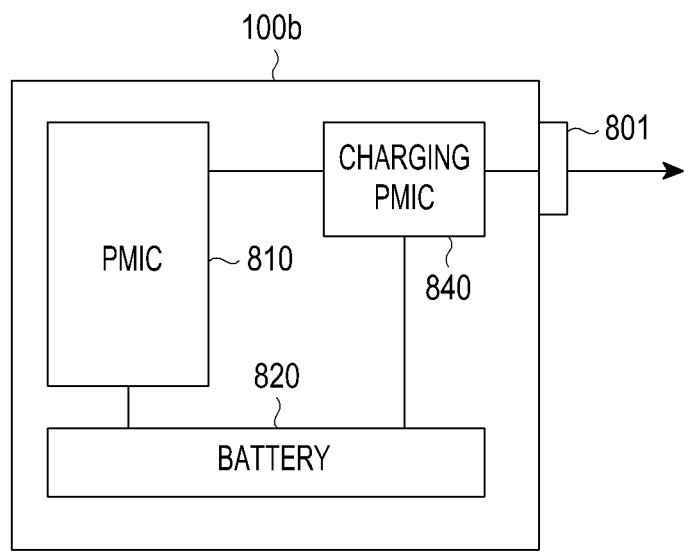

FIGS. 8A and 8B are block diagrams illustrating example power providing devices for providing power according to example embodiments of the present disclosure.

Referring to FIG. 8A, the power providing device 100b, e.g., a smartphone, may include a port 801, a PMIC (e.g., power management integrated circuit) 810, and a battery 820. The port 801 may have a form following, e.g., a USB standard, and may thus include a power lane capable of receiving power from the outside or sending power to the outside. According to an embodiment of the present disclosure, the PMIC 810 may vary at least one of the voltage and the current of power received from the battery 820. As the PMIC 810 connects to the port 801, the magnitude of power output to another electronic device through the port 801 may be adjusted. For example, the PMIC 810 may include at least one PMIC including various circuitry capable of adjusting the magnitude of voltage, such as, for example, and without limitation, an application processor (AP) PMIC. The AP PMIC may be a PMIC capable of adjusting the magnitude of power input or output from an AP of the power providing device 100b. According to an embodiment of the present disclosure, the battery 820 may be connected to the PMIC

810. The AP PMIC may vary the magnitude of power into various levels. A processor (not shown) included in the power providing device 100b may control the PMIC 810 to receive charging-related information from another electronic device and adjust at least one of the voltage and the current of power output through the port 801 based on the received charging-related information. The processor (not shown) may include various processing circuitry, such as, for example, and without limitation, one or more of a dedicated processor, a central processing unit (CPU), an application processor (AP), or a communication processor (CP). The processor (not shown) may perform control on at least one of the other components of the power providing device 100b, and/or perform an operation or data processing relating to communication. The processor (not shown) may be implemented as a MCU or mini-computer.

FIG. 8B is a block diagram illustrating an example power providing device 100b according to an embodiment of the present disclosure. The power providing device 100b may include a PMIC (e.g., a power management integrated circuit) 810 and a charging PMIC (e.g., a charging power management integrated circuit) 840. Here, the charging PMIC 840 may be a PMIC connected with a port 801. The charging PMIC 840 may transfer power from the PMIC 810 to the port 801. The PMIC 810 may vary at least one of the voltage and the current of power received from the battery 820. A processor (not shown) may include various processing circuitry to control the PMIC 810 to receive charging-related information from another electronic device and adjust at least one of the voltage and the current of power output through the port 801 based on the received charging-related information.

Figure 9:
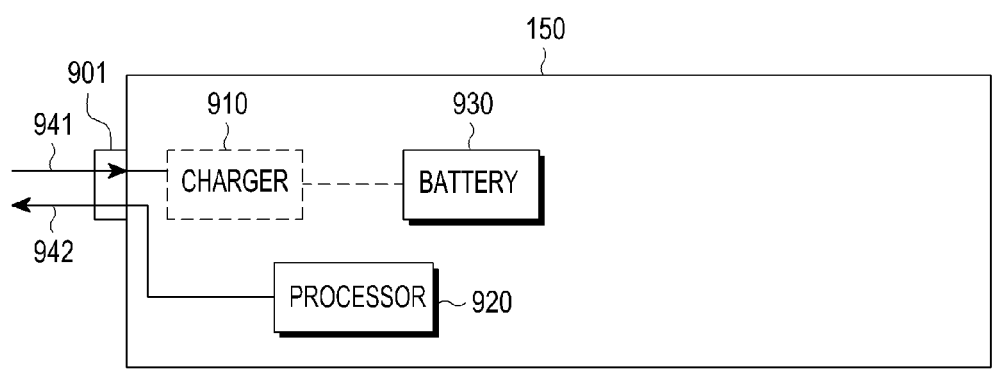
FIG. 9 is a block diagram illustrating an example electronic device receiving power according to an example embodiment of the present disclosure.

FIG. 9 is a block diagram illustrating an example electronic device receiving power according to an example embodiment of the present disclosure. The electronic device 150 may include a processor (e.g., including processing circuitry) 920 and a battery 930. The electronic device 150 may receive power from a power providing device as shown in, e.g., FIG. 8A or 8B. The electronic device 150 may or may not include a charger 910. When the electronic device 150 includes a charger 910, the charger 910 may process power 941 from the power providing device to fit for charging the battery 930 and provide the processed power to the battery 930. In this case, the processor 920 may send charging-related information 942 containing identification information about the electronic device 150 to the power providing device 100 through the port 901. The power providing device 100 may determine at least one of the voltage and the current of power for delivery to the charger 910 of the electronic device 150 using the identification information about the electronic device 150 included in the charging-related information 942. Meanwhile, unless the electronic device 150 includes the charger 910, the power providing device 100 may determine at least one of the voltage and the current of power for direct delivery to the battery 930 of the electronic device 150.

Meanwhile, the processor 920 may monitor information related to the battery 930, e.g., the voltage or capacity of the battery 930. The electronic device 150, although not shown, may include, e.g., a voltage meter or current meter capable of detecting the voltage or current of the battery 930. For example, the electronic device 150 may include a voltage meter or current meter implemented in various forms, such as an electrodynamometer-type voltage meter, capacitive voltage meter, digital voltage meter, DC current meter, AC current meter, or digital current meter. The processor 920 may send the information 942 related to the battery 930 to the power providing device 100 through, e.g., a data lane. The power providing device 100 may determine a charging profile using the received information 942 related to the battery 930 and provide power 941 following the determined charging profile to the charger 910 or battery 930.

Figure 10:
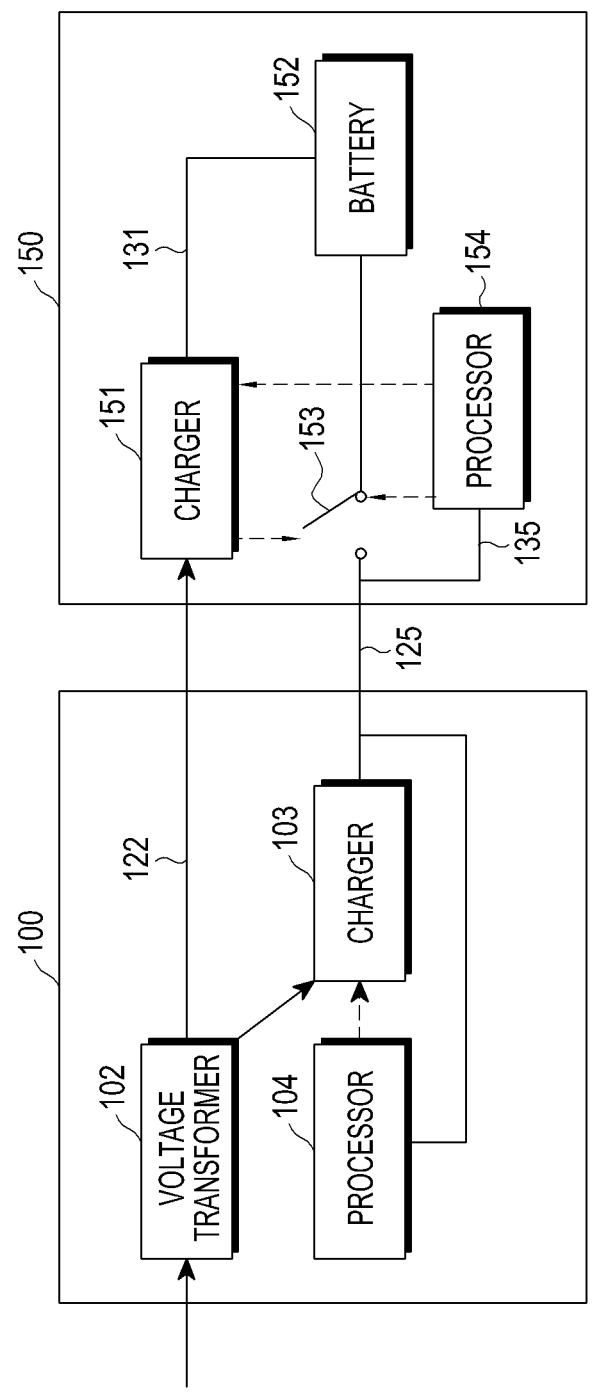
FIG. 10 is a block diagram illustrating an example power providing device and an electronic device according to an example embodiment of the present disclosure.

FIG. 10 is a block diagram illustrating an example power providing device and an electronic device according to an example embodiment of the present disclosure. The power providing device 100 may include a voltage transformer 102, a charger 103, and a processor (e.g., including processing circuitry) 104. The processor 104 may include various processing circuitry and control the charger 103 to adjust at least one of the voltage and the current of power input to the charger 103 to be fitted for charging the battery 152. The processor 104 may adjust the magnitude of power directly transferred to the battery 152 through a second path 125 based on charging-related information received through second paths 125 and 135 from the electronic device 150 as described above. Meanwhile, the power providing device 100 of FIG. 10 may be an adapter, and FIG. 10 illustrates some components of the adapter, e.g., a voltage transformer 102, a charger 103, and a processor 104 for ease of description.

Meanwhile, the power providing device 100 may communicate with the electronic device 150. According to an embodiment of the present disclosure, the processor 154 of the electronic device 150 may transfer data through the second paths 125 and 135, e.g., a data lane, to the processor 104 of the power providing device 100. According to an embodiment of the present disclosure, the power providing device 100 and the electronic device 150 may communicate with each other using a wireless communication scheme, such as bluetooth or bluetooth low energy (BLE). In this case, the power providing device 100 and the electronic device 150 may further include a communication unit comprising communication circuitry necessary for wireless communication. Accordingly, the electronic device 150 may send a request for performing, e.g., quick charging, to the power providing device 100. Upon detecting a condition for performing quick charging, the electronic device 150 may transfer the request for performing quick charging to the processor 104 of the power providing device 100 via the second paths 125 and 135. According to an embodiment of the present disclosure, the condition for performing quick charging may be obtained by a user input or the state of the electronic device 150. For example, the electronic device 150 may determine whether to perform quick charging based on, e.g., the temperature of the electronic device 150, remaining power of the battery, application usage information, whether a power saving mode is active, or whether an idle mode is active.

After requesting to perform quick charging, the processor 154 may control a switch 153 to an on state. The processor 104 may determine at least one of the voltage and the current of power output from the charger 103 based on at least one of identification information about the electronic device 150 and information related to the battery 152. The processor 104 may control the charger 103 to directly transfer the determined magnitude of power to the battery 152. The battery 152 may perform quick charging by receiving power from the charger 103 through the second path 125 while receiving power through the first path 131 connected with the battery 152 and the charger 151 and the first path 122 connected with the voltage transformer 102 and the charger 151.

Figure 11:
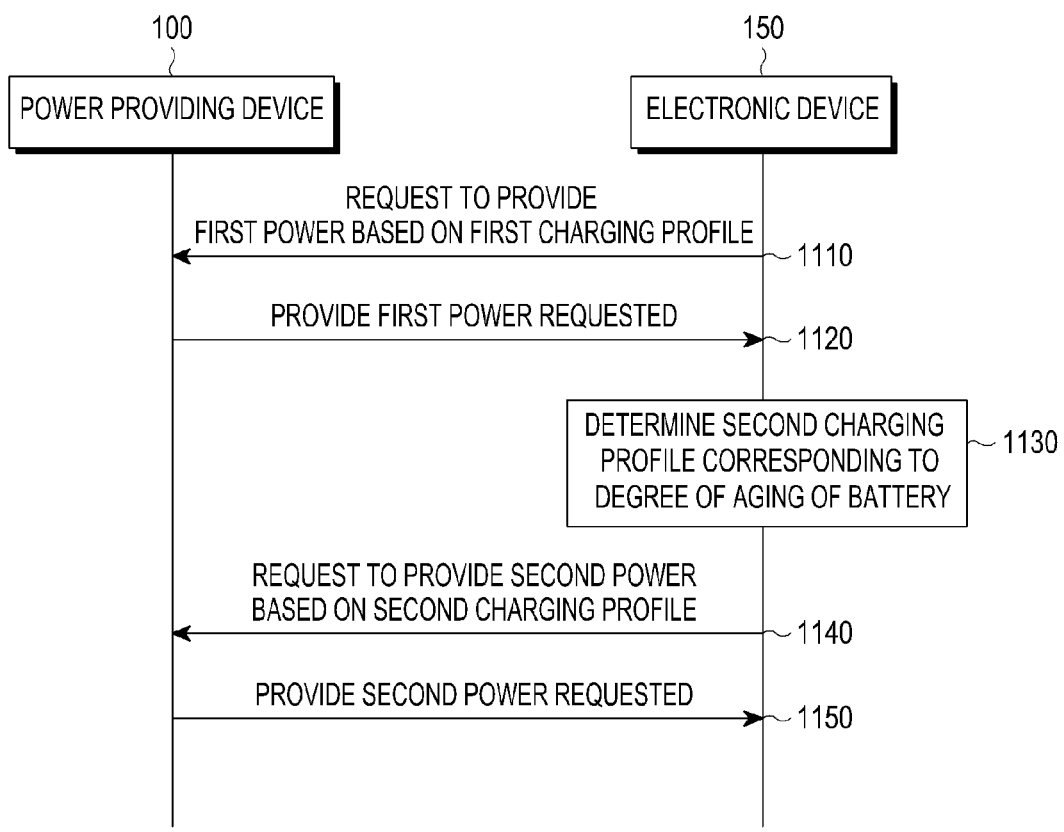
FIG. 11 is a flowchart illustrating an example method for controlling a power providing device and electronic device according to an example embodiment of the present disclosure.

FIG. 11 is a flowchart illustrating an example method for controlling a power providing device and electronic device according to an example embodiment of the present disclosure.

In operation 1110, the electronic device 150 may send a request for providing first power based on a first charging profile. Here, the entity determining the charging profile may be the electronic device 150. The electronic device 150 may send a request for the magnitude of power requested over time to the power providing device 100, which may mean that the electronic device 150 may directly provide the charging profile to the power providing device 100. The electronic device 150 may determine that a default charging profile or charging profile used latest is a first charging profile. The default charging profile may be associated with at least one of the rated voltage, rated current, and the magnitude of rated power of the battery of the electronic device 150. Meanwhile, the electronic device 150 may determine the first charging profile based on a charging mode (e.g., a normal charging mode or a quick charging mode).

In operation 1120, the power providing device 100 may provide the first power as requested. In operation 1130, the electronic device 150 may determine a second charging profile corresponding to the degree of aging of the battery. The electronic device 150 may determine the degree of variation in battery voltage per unit time or degree of variation in battery capacity per unit time while performing charging with the first power and determine the degree of aging of the battery using the same. The electronic device 150 may determine a second charging profile corresponding to the degree of aging of the battery. As set forth above, the electronic device 150 may select the charging profile corresponding to the determined degree of aging of the battery from among a plurality of charging profiles. Or, the electronic device 150 may directly generate a charging profile. In operation 1140, the electronic device 150 may request the power providing device 100 to provide second power based on the second charging profile. In other words, the electronic device 150 may provide the second charging profile to the power providing device 100. In operation 1150, the power providing device 100 may provide the second power requested to the electronic device 150.

Figure 12:
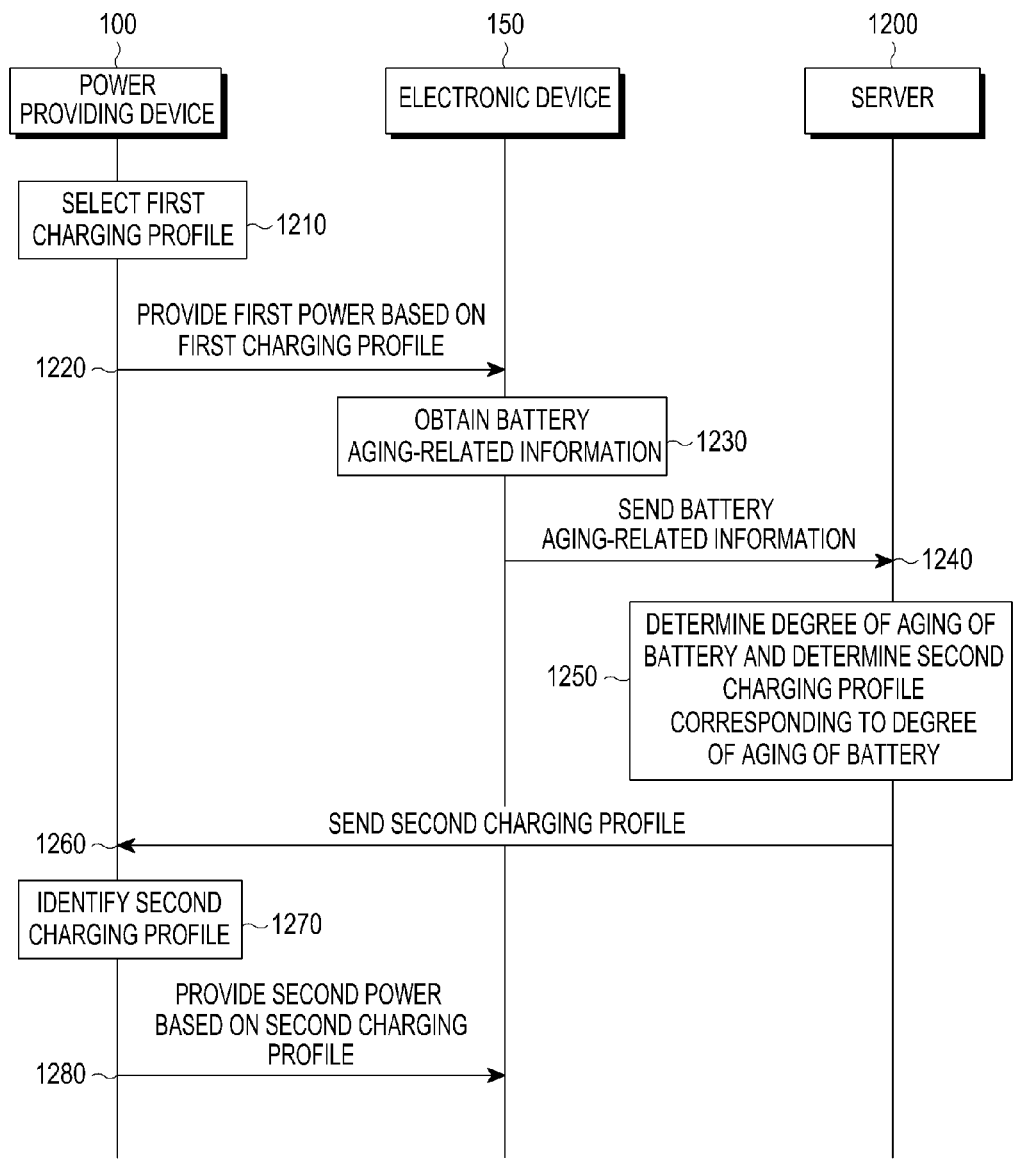
FIG. 12 is a flowchart illustrating an example method for controlling a power providing device, server, and electronic device according to an example embodiment of the present disclosure.

FIG. 12 is a flowchart illustrating an example method for controlling a power providing device, server, and electronic device according to an example embodiment of the present disclosure.

In operation 1210, the power providing device 100 may select a first charging profile. The power providing device 100 may select the first charging profile based on identification information about the electronic device 150. According to an embodiment of the present disclosure, the power providing device 100 may select the first charging profile based on information received from a server 1200.

In operation 1220, the power providing device 100 may provide first power to the electronic device 100 based on the first charging profile. In operation 1230, the electronic device 150 may obtain information related to the aging of the battery. For example, the electronic device 150 may measure the degree of variation in battery voltage per unit time or degree of variation in battery capacity per unit time during the course of the charging. In operation 1240, the electronic device 150 may send the obtained information related to the aging of the battery to the server 1200.

In operation 1250, the server 1200 may determine the degree of aging of the battery based on the information related to the aging of the battery received from the electronic device 150 and determine a second charging profile corresponding to the degree of aging of the battery. In the example embodiment of FIG. 12, the server 1200 may be the entity that determines a charging profile as per the degree of aging of the battery. The server 1200 may include a means with a relatively high computational capacity and may thus determine the second charging profile using a charging profile generating program that requires high computational load. Further, the server 1200 may include test samples with the charging profile and battery lifespan as previously performed. For example, the server 1200 may obtain various test samples and generate a more accurate charging profile by updating the charging profile generating program using the test samples.

In operation 1260, the server 1200 may send the second charging profile to the power providing device 100. Where the power providing device 100 is implemented as an adapter, and the power providing device 100 does not include a circuit for communication, the server 1200 may send the second charging profile to the electronic device 150, and the electronic device 150 may relay the same to the power providing device 100. In operation 1270, the power providing device 100 may identify the second charging profile. In operation 1280, the power providing device 100 may provide second power to the electronic device 150 based on the second charging profile.

Figure 13:
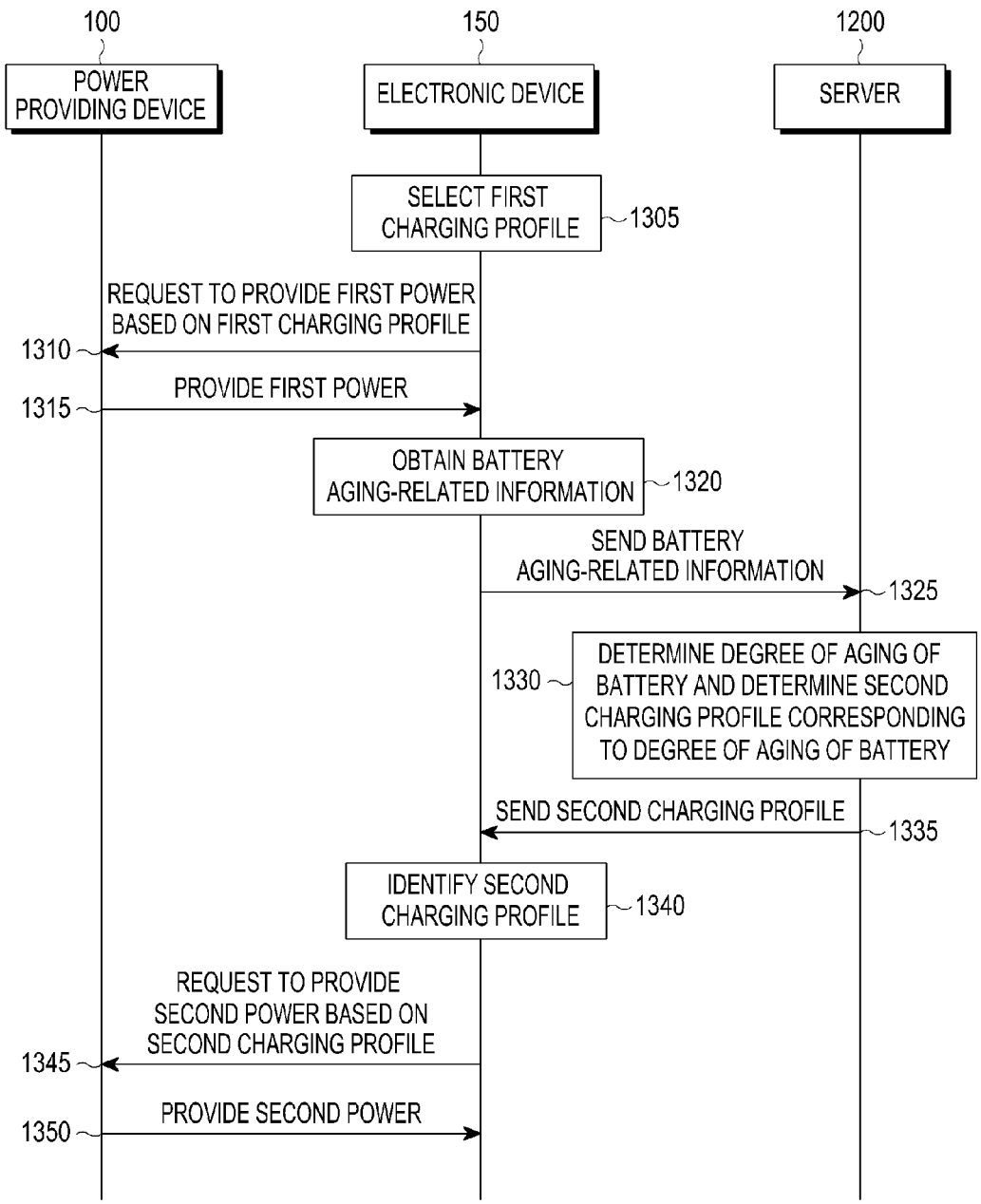
FIG. 13 is a flowchart illustrating an example method for controlling a power providing device, server, and electronic device according to an example embodiment of the present disclosure.

FIG. 13 is a flowchart illustrating an example method for controlling a power providing device, server, and electronic device according to an example embodiment of the present disclosure.

In operation 1305, the electronic device 150 may select a first charging profile. The electronic device 150 may determine power required by a charger or battery, thereby determining the first charging profile. The electronic device 150 may also determine the first charging profile based on a charging mode (e.g., a quick charging mode or normal charging mode). In operation 1310, the electronic device 150 may send a request for first power based on the first charging profile to the power providing device 100. In operation 1315, the power providing device 100 may provide first power to the electronic device 150 based on the request for providing power from the electronic device 150.

In operation 1320, the electronic device 150 may obtain information related to the aging of the battery. For example, the electronic device 150 may measure the degree of variation in voltage per unit time or the degree of variation in capacity per unit time. In operation 1325, the electronic device 150 may send information related to the aging of the battery to the server 1200. In operation 1330, the server 1200 may determine the degree of aging of the battery and determine a second charging profile corresponding to the degree of aging of the battery. In operation 1335, the server 1200 may send the second charging profile to the electronic device 150. In operation 1340, the electronic device 150 may identify the second charging profile received from the server 1200. In operation 1345, the electronic device 150 may send a request for second power as per the second charging profile to the power providing device 100. In operation 1350, the power providing device 100 may provide the second power to the electronic device 150.

Figure 14:
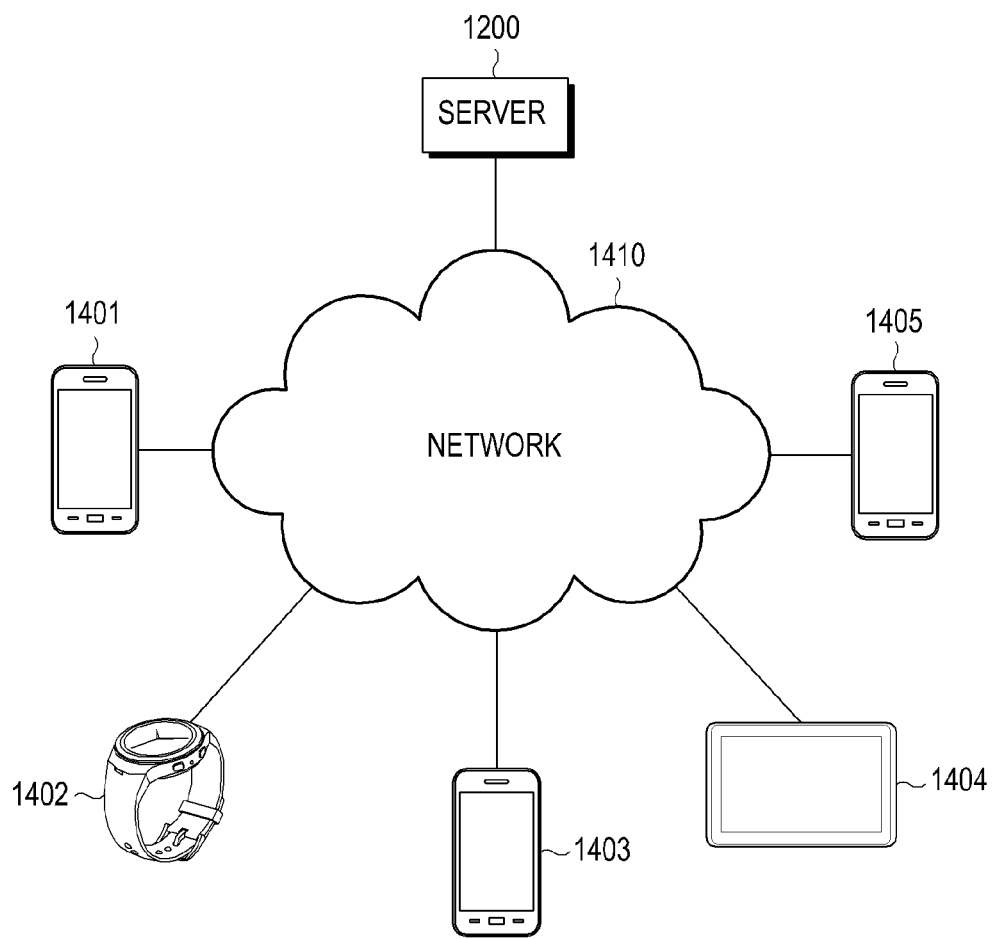
FIG. 14 is a diagram illustrating example operations of a server according to an example embodiment of the present disclosure.

FIG. 14 is a diagram illustrating example operations of a server according to an example embodiment of the present disclosure.

As illustrated in FIG. 14, the server 1200 may be connected with a plurality of electronic devices 1401, 1402, 1403, 1404 to 1405 through a network 1410. The server 1200 may manage the charging profile and battery-related information for each of the plurality of electronic devices 1401 to 1405. For example, the server 1200 may receive an indication that the electronic device 1401 performs charging with the first charging profile during a first time period. The server 1200 may also receive the degree of variation in battery voltage per unit time, e.g., the information related to the aging of the battery, while performing charging with the first charging profile. The server 1200 may also receive an indication that the electronic device 1401 performs charging with the second charging profile during a second time period and receive the information related to the aging of the battery during the period. The server 1200 may determine the optimum charging profile using the battery aging-related information per charging profile. For example, upon determining that the aging of battery is slowed down by the second charging profile, the server 1200 may determine that the second charging profile is a charging profile appropriate for the degree of aging of the battery. When the speed at which the battery ages under the second charging profile is not varied or increased as compared with that under the first charging profile, the server 1200 may attempt to change the optimal charging profile into another charging profile. The server 1200 may generate a charging profile corresponding to a particular degree of aging of the battery based on various charging profile generating algorithms as described above. Further, the server 1200 may receive a feedback of the degree of aging of the battery by the charging profile and may thus determine whether a generated charging profile is appropriate for the corresponding degree of aging of the battery. Upon determining that the charging profile at a particular degree of aging of the battery is the optimized charging profile, the server 1200 may apply the charging profile to other electronic devices of the same model. For example, upon determining that the degree of aging of the battery of the electronic device 1401 is a numerical value 'a,' the server 1200 may store information indicating that the third charging profile is the optimized charging profile. Meanwhile, the server 1200 may determine that the degree of aging of the battery of the electronic device 1403, which is of the same model as the electronic device 1401, is a numerical value 'b.' Upon determining that a difference in the degree of aging of the battery is less than a threshold, the server 1200 may transfer information related to the third charging profile to the electronic device 1403 or a power providing device (not shown) providing power to the electronic device 1403 so that the electronic device 1403 is charged with the third charging profile already determined to be the optimized charging profile.

The server 1200 may obtain multiple test samples, thereby generating a more accurate charging profile per degree of aging of the battery. According to an example embodiment of the present disclosure, the electronic devices 1401 to 1405 each may share charging-related information or charging profiles using a charging application. The charging application may be run by a user input or with no special input. Meanwhile, each of the server 1200 and the electronic devices 1401 to 1405 may include a communication circuit capable of communication through the network. The server 1200 may also include a processor including processing circuitry capable of generating charging profiles and a memory capable of storing a charging profile per electronic device or data.

Figure 15:
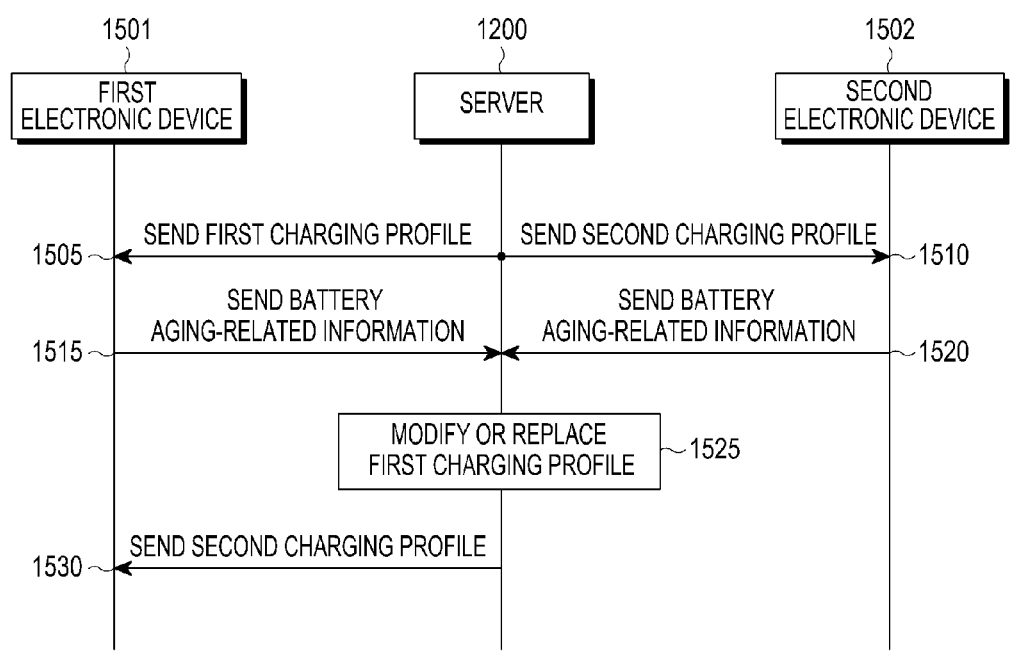
FIG. 15 is a flowchart illustrating an example method for controlling a server and electronic device according to an example embodiment of the present disclosure.

FIG. 15 is a flowchart illustrating example operations of a server and electronic device according to an example embodiment of the present disclosure.

In operation 1505, the server 1200 may send a first charging profile to a first electronic device 1501. Here, the first charging profile may include at least one of a charging profile performed latest on the first electronic device 1501, a charging profile corresponding to identification information about the first electronic device 1501, and a charging profile determined to be the optimized for the degree of aging of the battery of the first electronic device 1501. The server 1200 may send the first charging profile to the first electronic device 1501. Meanwhile, although FIG. 15 illustrates that the server 1200 directly provides the first charging profile to the first electronic device 1501, this is merely an example. Alternatively, the server 1200 may directly provide the first charging profile to a power providing device that provides power to the first electronic device 1501 or may provide the first charging profile through the first electronic device 1501. In other words, the communication circuit of the server 1200 may send the first charging profile to the first electronic device 1501 or the power providing device that provides power to the first electronic device 1501.

In operation 1510, the server 1200 may send a second charging profile to a second electronic device 1502. The server 1200 may send the second charging profile to a second electronic device 1502 or a power providing device that provides power to the second electronic device 1502 so that the second electronic device 1502 may perform charging. As set forth above, the second charging profile may be provided to the second electronic device 1502, directly to the power providing device that provides power to the second electronic device 1502, or through the second electronic device 1502. Here, the second charging profile is assumed to be different from the first charging profile. The second electronic device 1502 is assumed to have the same identification information and the same degree of aging of the battery as the first electronic device 1501. For example, the server 1200 may generate two or more charging profile candidates for a corresponding degree of aging of the battery and test the same for other electronic devices. The charging profile performed latest by the second electronic device 1502 may differ from that for the first electronic device 1501.

In operation 1515, the first electronic device 1501 may send information about the aging of battery to the server 1200. In operation 1520, the second electronic device 1502 may send information about the aging of battery to the server 1200. In operation 1525, the server 1200 may modify or replace the first charging profile with the second charging profile using the first charging profile and information related to the aging of battery received from the first electronic device 1501 and the second charging profile and information related to the aging of battery received from the second electronic device 1502. For example, the server 1200 may determine that the second charging profile is the optimized charging profile based on the indication that the aging of the battery in the second electronic device 1502 is slowed down or the charging of the battery is stably performed. Thus, the server 1200, in operation 1530, may provide the second charging profile to the first electronic device 1501 or power providing device that provides power to the first electronic device 1501 so that the first electronic device 1501 may perform charging with the second charging profile. Meanwhile, the second electronic device 1502 that receives no further special charging profile may continue to perform charging with the previous charging profile, e.g., the second charging profile.

Figure 16A:
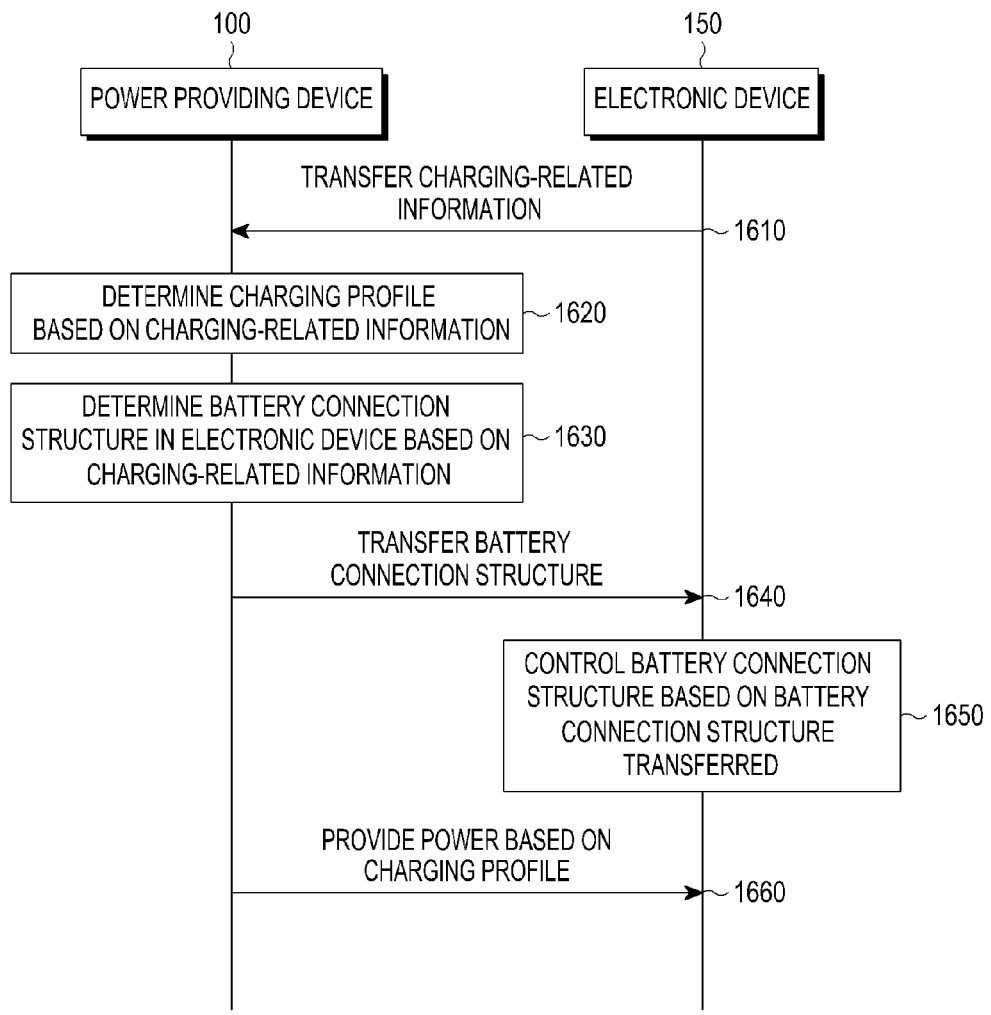
FIG. 16A is a flowchart illustrating an example method for controlling a power providing device and electronic device according to an example embodiment of the present disclosure.
Figure 17A:
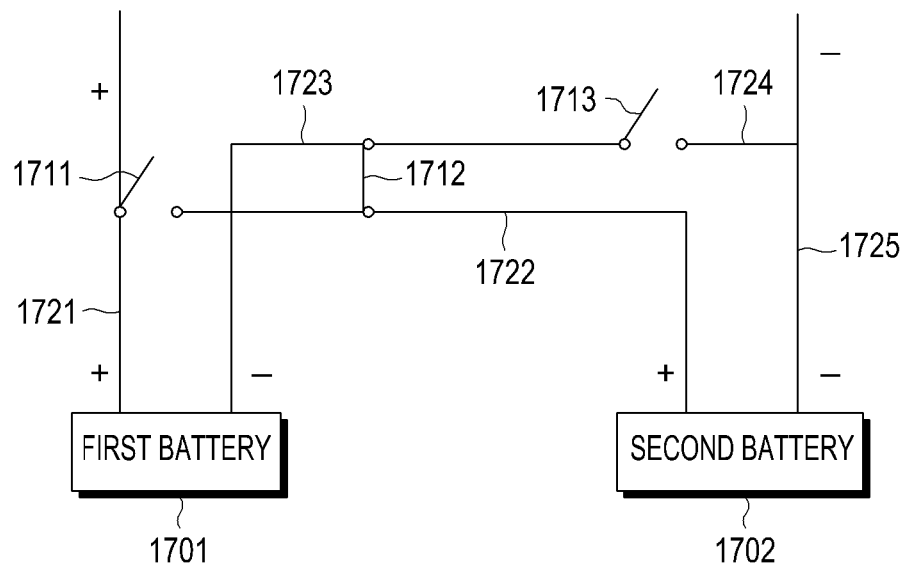
FIGS. 17A and 17B are diagrams illustrating example battery connection control according to an example embodiment of the present disclosure.
Figure 17B:
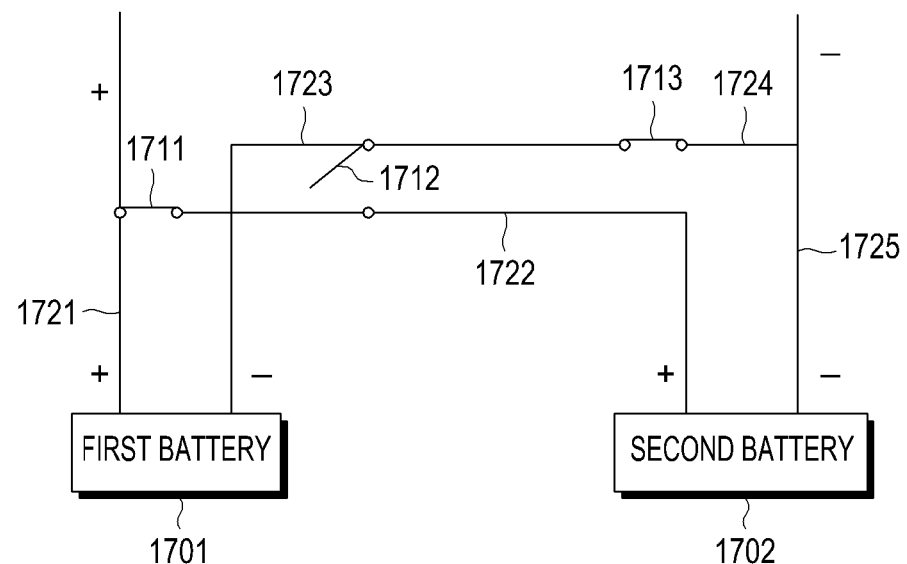

FIG. 16A is a flowchart illustrating an example method for controlling a power providing device and electronic device according to an example embodiment of the present disclosure. The embodiment of FIG. 16A is described in further detail with reference to FIGS. 17A and 17B. FIGS. 17A and 17B are diagrams illustrating examples of battery connection control according to an example embodiment of the present disclosure.

In operation 1610, the electronic device 150 may transfer charging-related information to the power providing device. In operation 1620, the electronic device 150 may determine a charging profile based on the charging-related information. In operation 1630, the power providing device 100 may determine a battery connection structure in the electronic device 150 based on the charging-related information. For example, the power providing device 100 may determine a charging profile based on the charging-related information and determine the connection structure of a plurality of batteries of the electronic device 150 using the charging profile.

Referring to FIG. 17A, the electronic device 150 may include a plurality of batteries 1701 and 1702. The power providing device 100 may identify that the electronic device 150 includes the plurality of batteries 1701 and 1702 based on identification information about the electronic device 150 contained in the charging-related information. The power providing device 100 may determine a connection structure in which the first battery 1701 and the second battery 1702 are connected in series or a connection structure in which the first battery 1701 and the second battery 1702 are connected in parallel based on the charging profile. When the first battery 1701 and the second battery 1702 are connected in series, the charging current flowing through the first battery 1701 and the second battery 1702 may be reduced. When the first battery 1701 and the second battery 1702 are connected in parallel, the charging current flowing through the first battery 1701 and the second battery 1702 may be increased.

Where the determined charging profile is set to provide a relatively high current, the power providing device 100 may determine a connection structure in which the first battery 1701 and the second battery 1702 are connected in parallel. The power providing device 100 may determine a connection structure allowing the determined charging profile to provide a relatively low current. For example, as a series connection is made, the influence on the resistance component by the connection may be reduced, and the loss by the connection upon charging with a low current may be minimized and/or reduces. As will be described in greater detail below, the configurations of the various switch elements and conducting lines illustrated in FIGS. 17A and 17B determine the series or parallel battery connection structure of the batteries 1701, 1702.

In operation 1640, the power providing device 100 may transfer the battery connection structure to the electronic device 150. In operation 1650, the electronic device 150 may control the battery connection structure based on the received battery connection structure. For example, the electronic device 150 may include a battery connection structure adjusting circuit as shown in FIGS. 17A and 17B. The battery connection structure adjusting circuit may include switches 1711, 1712, and 1713 and conducting lines 1721, 1722, 1723, 1724, and 1725. Referring to FIG. 17A, the first conducting line 1721 may be connected to the positive electrode of the first battery 1701. The first switch 1711 may be connected to the first conducting line 1721. The first switch 1711 may connect or disconnect the first conducting line 1721 from the second conducting line 1722 connected to the positive electrode of the second battery 1702. The third conducting line 1723 may be connected to the negative electrode of the first battery 1701. The second switch 1712 and the third switch 1713 may be connected to the third conducting line 1723. The second switch 1712 may connect or disconnect the second conducting line 1722 from the third conducting line 1723. The third switch 1713 may connect or disconnect the third conducting line 1723 from the fourth conducting line 1724. The fourth conducting line 1724 may be connected with the fifth conducting line 1725 connected to the negative electrode of the second battery 1702. The electronic device 150 may open the first switch 1711, close the second switch 1712, and open the third switch 1713, connecting the first battery 1701 and the second battery 1702 in series. As shown in FIG. 17B, the electronic device 150 may close the first switch 1711, open the second switch 1712, and close the third switch 1713, connecting the first battery 1701 and the second battery 1702 in parallel. Meanwhile, where the batteries 1701 and 1702 are connected in series, the conducting line connected to the positive electrode and negative electrode of one of the batteries 1701 and 1702 may be connected to a PMIC of the electronic device 150 to supply power, allowing system power to be supplied even while charging.

In operation 1660, the power providing device 100 may provide power to the electronic device 150 based on a charging profile. Accordingly, the electronic device 150 may perform control so that power appropriate for the charging profile is delivered to the battery, thereby allowing for stable charging.

Figure 16B:
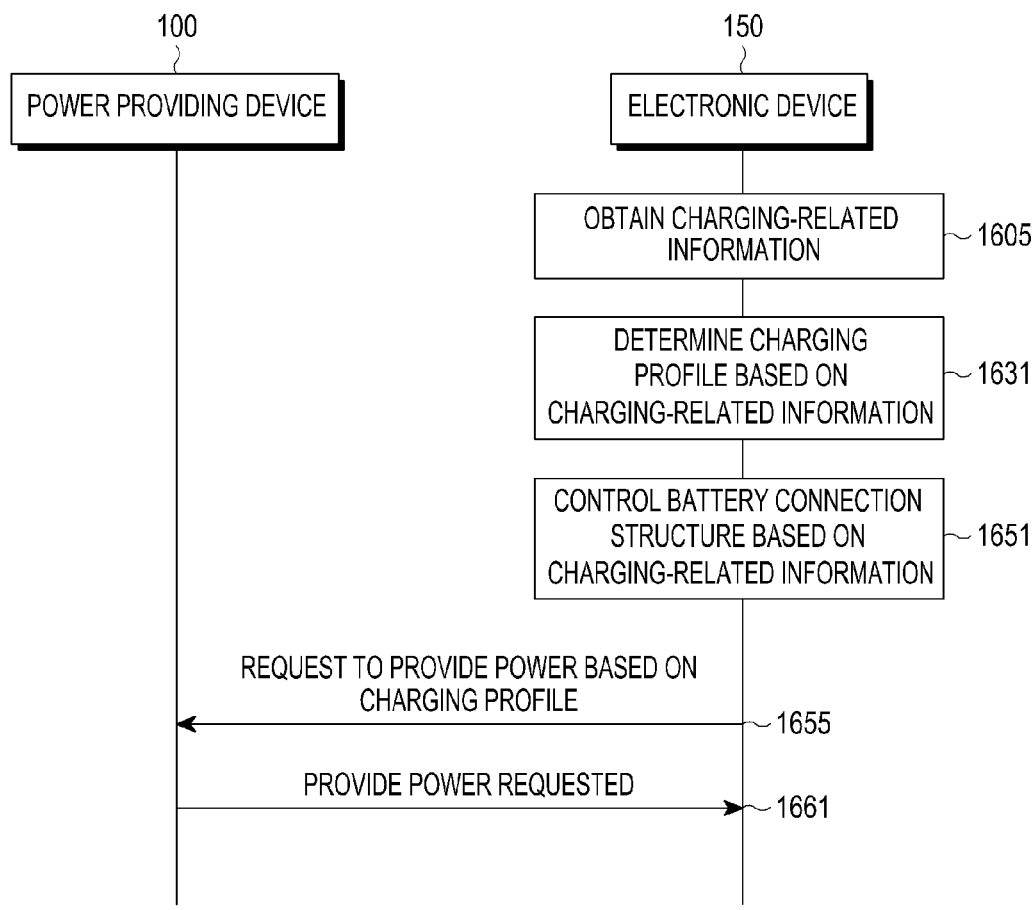
FIG. 16B is a flowchart illustrating an example method for controlling a power providing device and electronic device according to an example embodiment of the present disclosure.

FIG. 16B is a flowchart illustrating an example method for controlling a power providing device and electronic device according to an embodiment of the present disclosure. In operation 1605, the electronic device 150 may obtain charging-related information. In operation 1631, the electronic device 150 may determine a charging profile based on the charging-related information. In other words, the electronic device 150 may determine the charging profile and may control a battery connection structure based on the determined charging profile in operation 1651. In operation 1655, the electronic device 150 may request the power providing device 100 to provide power based on the charging profile. In operation 1661, the power providing device 100 may provide the power as requested.

According to an example embodiment of the present disclosure, a storage medium storing commands is provided, the commands configured to be executed by at least one processor to enable the at least one processor to perform at least one operation that includes receiving, from an electronic device, at least one of identification information about the electronic device and information related to a battery of the electronic device, determining at least one of a voltage and a current of the power using at least one of the identification information about the electronic device and the information related to the battery of the electronic device, and providing power with the determined one of the voltage and the current to the electronic device.

According to an embodiment of the present disclosure, a storage medium storing commands is provided, the commands configured to be executed by at least one processor to enable the at least one processor to perform at least one operation that includes sending at least one of identification information about the electronic device and information related to a battery of the electronic device to the power providing device and receiving power which has magnitude being adjusted based on at least one of the identification information about the electronic device and the information related to the battery and charging the battery.

According to an embodiment of the present disclosure, a storage medium storing commands is provided, the commands configured to be executed by at least one processor to enable the at least one processor to perform at least one operation that includes sending a first charging profile by a first electronic device, receiving, from the first electronic device, information related to a battery of a first electronic device that performs charging based on the first charging profile, varying a charging profile of the first electronic device from the first charging profile to a second charging profile based on the information related to the battery of the first electronic device, and sending the second charging profile.

The above-described commands may be stored in an external server and may be downloaded and installed on an electronic device, such as a wireless power transmitter. In other words, according to an example embodiment of the present disclosure, the external server may store commands that are downloadable by the wireless power transmitter.

As is apparent from the foregoing description, according to various example embodiments of the present disclosure, power providing devices capable of determining the magnitude of power that is supplied to an electronic device using at least one of identification information about the electronic device and information related to the battery of the electronic device and methods for controlling the power providing device may be provided. There may also be provided electronic devices that receive power from such power providing device and methods for controlling the electronic devices.

The various example embodiments disclosed herein are provided for description and understanding of the disclosed technology and does not limit the scope of the present disclosure. Accordingly, the scope of the present disclosure should be understood as including all changes or various embodiments based on the technical spirit of the present disclosure.

What is claimed is:

1. A power providing device, comprising:
a communication circuit;
a charger comprising charging circuitry configured to provide a power to an electronic device external to the power providing device; and
a processor configured to:
receive, from the electronic device through the communication circuit, identification information of the electronic device,
control the charger to provide a first power having first magnitude corresponding to the identification information of the electronic device to the electronic device,
receive, from the electronic device through the communication circuit, first information including at least one of information on a variation in a voltage per unit time of a battery of the electronic device or information on a variation in a capacity per unit time of the battery of the electronic device while providing the first power,
control the charger to adjust at least one of a voltage or a current of the first power based on the first information, the adjusted power having a second magnitude, and
control the charger to provide the adjusted power to the electronic device.

2. The power providing device of claim 1, wherein the charger is further configured to directly transfer the power to the battery of the electronic device.

3. The power providing device of claim 1, further comprising a voltage transformer configured to:
voltage-transform the power from a power supplying source, and
provide the voltage-transformed power to the charger,
wherein the charger is configured to directly transfer first power from the voltage transformer to the battery of the electronic device, and
wherein the voltage transformer is configured to transfer second power different from the first power to the charger of the electronic device.

4. The power providing device of claim 1, wherein the processor is further configured to:
identify a battery connection structure of the electronic device corresponding to at least one of the voltage or the current of the power, and
send information of the battery connection structure of the electronic device to the electronic device.

5. The power providing device of claim 1, wherein the processor is further configured to select at least one of the voltage or the current of the power from among a plurality of preset values or to identify at least one of the voltage or the current of the power.

6. An electronic device configured to receive power from a power providing device, the electronic device comprising:
a battery; and
a processor configured to:
send identification information of the electronic device to the power providing device; and
send first information including at least one of information on a variation in a voltage per unit time of the battery of the electronic device or information on a variation in a capacity per unit time of the battery of the electronic device, while the battery is being provided with a first power having first magnitude corresponding to the identification information of the electronic device,
wherein the electronic device is configured to receive a second power having at least one of a voltage or a current adjusted based on the first information and charge the battery with the second power, the second power having a second magnitude.

7. The electronic device of claim 6, further comprising another battery,
wherein the processor is further configured to control a connection structure of the battery and the another battery based on information related to the battery and the another battery.

8. A method for controlling a power providing device configured to provide power to an electronic device external to the power providing device, the method comprising:
receiving, from the electronic device through the communication circuit, identification information of the electronic device,
providing, to the electronic device, a first power having a first magnitude corresponding to the identification information of the electronic device,
receiving, from the electronic device through a communication circuit, first information including at least one of information on a variation in a voltage per unit time of a battery of the electronic device or information on a variation in a capacity per unit time of the battery of the electronic device while providing the first power;
identifying at least one of a voltage or a current of the power based on the first information; and
providing, to the electronic device, a second power with at least one of the identified voltage or the identified current, the second power having a second magnitude.

9. The method of claim 8, further comprising:
identifying a battery connection structure of the electronic device corresponding to at least one of the voltage or the current of the power; and sending the identified battery connection structure of the electronic device to the electronic device.

10. The method of claim 8, wherein the identifying at least one of the voltage or the current of the power of the pwoer includes selecting at least one of the voltage or the current of the power from among a plurality of preset values or computing at least one of the voltage or the current of the power.

11. A server configured to manage a plurality of electronic devices, the server comprising:
   a communication circuit; and
   at least one processor configured to:
   control to send, through the communication circuit, a first charging profile,
   control to receive, through the communication circuit, first information including at least one of information on a variation in a voltage of a battery of a first electronic device, or information on a variation in a capacity of the battery of the first electronic device, wherein the first electronic device is for performing charging based on the first charging profile,
   control to vary a charging profile of the first electronic device from the first charging profile to a second charging profile based on the first information, and
   control to send, through the communication circuit, the second charging profile.

* * * * *